United States Patent
Kim et al.

(10) Patent No.: US 11,323,887 B2
(45) Date of Patent: May 3, 2022

(54) METHOD FOR TERMINAL FOR TRANSMITTING UPLINK SIGNAL IN WIRELESS COMMUNICATION SYSTEM SUPPORTING UNLICENSED BAND, AND APPARATUS SUPPORTING METHOD

(71) Applicant: LG Electronics Inc., Seoul (KR)

(72) Inventors: Seonwook Kim, Seoul (KR); Jonghyun Park, Seoul (KR); Changhwan Park, Seoul (KR); Joonkui Ahn, Seoul (KR); Suckchel Yang, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 83 days.

(21) Appl. No.: 16/649,887

(22) PCT Filed: Sep. 27, 2018

(86) PCT No.: PCT/KR2018/011412
§ 371 (c)(1),
(2) Date: Mar. 23, 2020

(87) PCT Pub. No.: WO2019/066482
PCT Pub. Date: Apr. 4, 2019

(65) Prior Publication Data
US 2020/0280859 A1 Sep. 3, 2020

Related U.S. Application Data

(60) Provisional application No. 62/564,207, filed on Sep. 27, 2017.

(30) Foreign Application Priority Data

Aug. 3, 2018 (KR) .......... 10-2018-0090986

(51) Int. Cl.
H04W 16/14 (2009.01)
H04W 72/04 (2009.01)
(Continued)

(52) U.S. Cl.
CPC ......... *H04W 16/14* (2013.01); *H04W 72/042* (2013.01); *H04W 72/046* (2013.01);
(Continued)

(58) Field of Classification Search
CPC . H04W 16/14; H04W 72/042; H04W 72/046; H04W 72/1284; H04W 72/14; H04W 74/0808
See application file for complete search history.

(56) References Cited

U.S. PATENT DOCUMENTS 9,979,581 B2 * 5/2018 Yang .............. H04L 27/2666
10,015,783 B2 * 7/2018 Yin ................ H04L 5/0053
(Continued)

FOREIGN PATENT DOCUMENTS

| KR | 20170093059 | 4/2016 |
| KR | 20170093059 | 8/2017 |
| WO | WO 2017/010764 | 1/2017 |

OTHER PUBLICATIONS

International Search Report in International Appln. No. PCT/KR2018?011412, dated Jan. 10, 2019, 17 pages (with English translation).

*Primary Examiner* — Eric Nowlin
(74) *Attorney, Agent, or Firm* — Fish & Richardson P.C.

(57) ABSTRACT

Disclosed are a method for a terminal for transmitting an uplink signal in a wireless communication system supporting an unlicensed band, and an apparatus supporting the method. The present invention includes specific examples, such as an embodiment in which, if a terminal is transmitting a signal in the direction of a particular beam, then, on the basis of the direction of a beam of a base station sharing the (Continued)

unlicensed band, the terminal adaptively transmits an uplink signal in the unlicensed band.

13 Claims, 17 Drawing Sheets

(51) Int. Cl.
    *H04W 72/12*     (2009.01)
    *H04W 72/14*     (2009.01)
    *H04W 74/08*     (2009.01)

(52) U.S. Cl.
    CPC ....... *H04W 72/1284* (2013.01); *H04W 72/14* (2013.01); *H04W 74/0808* (2013.01)

(56) References Cited

U.S. PATENT DOCUMENTS

| | | | | |
|---|---|---|---|---|
| 10,178,696 | B2* | 1/2019 | Cheng | H04W 16/14 |
| 10,292,182 | B2* | 5/2019 | Yang | H04W 74/0816 |
| 10,492,222 | B2* | 11/2019 | Kim | H04L 5/001 |
| 10,701,677 | B2* | 6/2020 | Park | H04L 1/1671 |
| 10,798,728 | B2* | 10/2020 | Park | H04W 72/1268 |
| 2011/0255460 | A1* | 10/2011 | Lohmar | H04W 48/16 370/312 |
| 2015/0365830 | A1* | 12/2015 | Wei | H04W 16/14 370/280 |
| 2016/0353467 | A1 | 12/2016 | Nekovee | |
| 2016/0360553 | A1* | 12/2016 | Cheng | H04W 74/006 |
| 2017/0171887 | A1 | 6/2017 | Shi et al. | |
| 2017/0238334 | A1* | 8/2017 | Yang | H04W 74/0808 370/336 |
| 2017/0302493 | A1* | 10/2017 | Yang | H04L 1/0029 |
| 2017/0332358 | A1* | 11/2017 | Park | H04W 72/042 |
| 2018/0255578 | A1* | 9/2018 | Kim | H04W 74/0808 |
| 2018/0288805 | A1* | 10/2018 | Bhorkar | H04W 74/0808 |
| 2019/0373635 | A1* | 12/2019 | Yang | H04B 7/0408 |
| 2020/0275490 | A1* | 8/2020 | Li | H04L 5/0007 |
| 2020/0280859 | A1* | 9/2020 | Kim | H04W 72/042 |
| 2020/0305191 | A1* | 9/2020 | Moon | H04W 16/14 |
| 2020/0313816 | A1* | 10/2020 | Sun | H04L 5/0094 |
| 2020/0314902 | A1* | 10/2020 | Sun | H04W 74/0808 |
| 2020/0359411 | A1* | 11/2020 | Li | H04W 16/14 |
| 2021/0022157 | A1* | 1/2021 | Sun | H04W 72/1289 |
| 2021/0084683 | A1* | 3/2021 | Li | H04W 16/14 |
| 2021/0160853 | A1* | 5/2021 | Gao | H04W 72/046 |
| 2021/0168770 | A1* | 6/2021 | Oh | H04W 74/08 |
| 2021/0218503 | A1* | 7/2021 | Babaei | H04L 1/1812 |
| 2021/0352688 | A1* | 11/2021 | Luo | H04W 72/1268 |

* cited by examiner

METHOD FOR TERMINAL FOR TRANSMITTING UPLINK SIGNAL IN WIRELESS COMMUNICATION SYSTEM SUPPORTING UNLICENSED BAND, AND APPARATUS SUPPORTING METHOD

CROSS-REFERENCE TO RELATED APPLICATIONS

This application is a National Stage application under 35 U.S.C. § 371 of International Application No. PCT/KR2018/011412, filed on Sep. 27, 2018, which claims the benefit of Korean Application No. 10-2018-0090986, filed on Aug. 3, 2018, and U.S. Provisional Application No. 62/564,207, filed on Sep. 27, 2017. The disclosures of the prior applications are incorporated by reference in their entirety.

TECHNICAL FIELD

The present disclosure relates to a wireless communication system, and more particularly, to a method of transmitting an uplink signal by a terminal in a wireless communication system supporting an unlicensed band and apparatus for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE

Technical Problem

The object of the present disclosure is to provide a method by which a terminal (or user equipment) transmits an uplink signal in a wireless communication system supporting an unlicensed band and apparatus supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method of transmitting an uplink signal by a user equipment (UE) to a base station in a wireless communication system supporting an unlicensed band and apparatus for supporting the same.

In an aspect of the present disclosure, provided herein is a method of transmitting an uplink signal by a UE to a base station in a wireless communication system supporting an unlicensed band. The method may include receiving scheduling information for scheduling uplink signal transmission in the unlicensed band from the base station and performing the scheduled uplink signal transmission to the base station in the unlicensed band based on a channel access procedure (CAP). When the uplink signal transmission is scheduled within a channel occupancy time (COT) occupied by the base station, the type of the CAP may be determined depending on whether a first beam of a downlink transmission burst transmitted from the base station is associated with a second beam for the uplink signal transmission within the COT.

The scheduling information may be received in an uplink grant or downlink control information (DCI).

When the second beam is associated with the first beam, the second beam may be associated with a third beam for reception of the downlink transmission burst.

In the present disclosure, the type of the CAP may be set to either a first type of CAP based on random backoff or a second type of CAP for sensing whether the unlicensed band is idle for a predetermined time.

For example, when the uplink signal transmission is scheduled within the COT occupied by the base station and the first and second beams are associated with each other, the UE may perform the scheduled uplink signal transmission to the base station in the unlicensed band based on the second type of CAP.

In addition, when the uplink signal transmission is scheduled within the COT occupied by the base station and the first and second beams are associated with each other, the UE may receive a signal for signaling the second type of CAP as the type of the CAP for the uplink signal transmission.

As another example, when the uplink signal transmission is scheduled within the COT occupied by the base station and the first and second beams are associated with each other, the UE may perform the scheduled uplink signal transmission to the base station in the unlicensed band based on the second type of CAP even though the UE receives a signal for signaling the first type of CAP as the type of the CAP for the uplink signal transmission.

As still another example, when the uplink signal transmission is scheduled within the COT occupied by the base station and the first and second beams are associated with each other, the UE may perform the scheduled uplink signal transmission to the base station in the unlicensed band based on the second type of CAP without reception of a signal for signaling the type of the CAP for the uplink signal transmission.

As a further example, when the uplink signal transmission is scheduled within the COT occupied by the base station and the first and second beams are not associated with each other, the UE may perform the scheduled uplink signal transmission to the base station in the unlicensed band based on the first type of CAP.

As a still further example, when the uplink signal transmission is not scheduled within the COT occupied by the base station, the UE may perform the scheduled uplink signal transmission to the base station in the unlicensed band based on the first type of CAP.

In another aspect of the present disclosure, provided herein is a UE for transmitting an uplink signal to a base station in a wireless communication system supporting an unlicensed band. The UE may include a transmitter, a receiver, and a processor connected to the transmitter and the receiver. The processor may be configured to control the receiver to receive scheduling information for scheduling uplink signal transmission in the unlicensed band from the base station and control the transmitter to perform the scheduled uplink signal transmission to the base station in the unlicensed band based on a CAP. When the uplink signal transmission is scheduled within a COT occupied by the base station, the type of the CAP may be determined depending on whether a first beam of a downlink transmission burst transmitted from the base station is associated with a second beam for the uplink signal transmission within the COT.

It will be understood by those skilled in the art that the above-described aspects of the present disclosure are merely part of the embodiments of the present disclosure and various modifications and alternatives could be developed from the following technical features of the present disclosure.

Advantageous Effects

As is apparent from the above description, the embodiments of the present disclosure have the following effects.

According to the present disclosure, when a user equipment (UE) and a base station transmit and receive a beamformed signal in an unlicensed band, the UE may perform scheduled uplink signal transmission in the unlicensed band adaptively depending on whether the uplink signal transmission is an uplink transmission burst shared with the base station.

It will be appreciated by persons skilled in the art that the effects that could be achieved with the present disclosure are not limited to what has been particularly described hereinabove and other advantages of the present disclosure will be more clearly understood from the following detailed description. That is, effects which are not intended by the present disclosure may be derived by those skilled in the art from the embodiments of the present disclosure.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

BEST MODE

Figure 1:
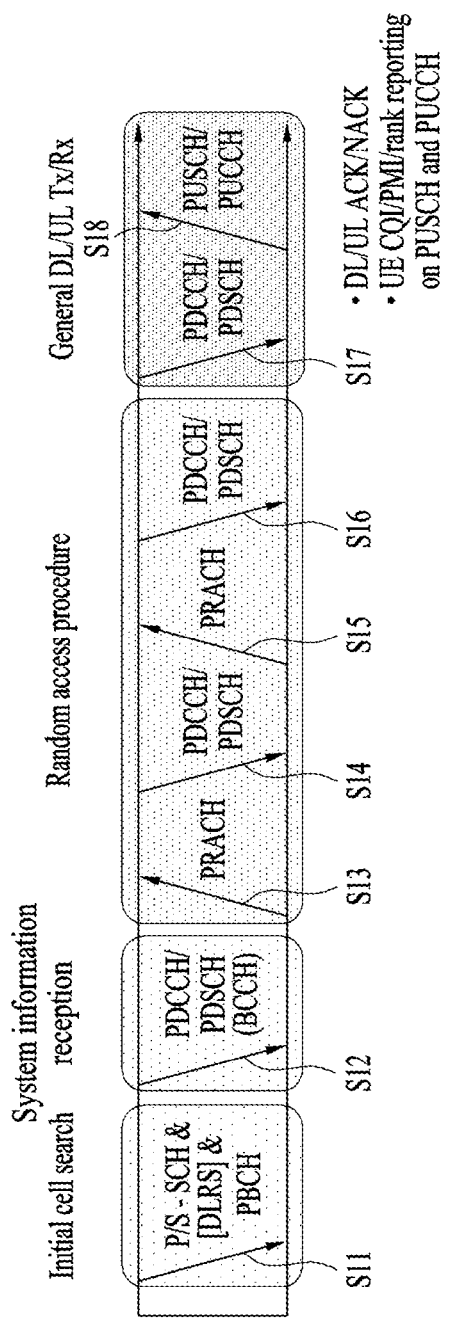
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system, and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems and 3GPP NR system are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

For clarification of description for technical features of the present disclosure, although the embodiments of the present disclosure will be described based on a 3GPP NR system as well as a 3GPP LTE/LTE-A system, the present disclosure may be applied to an IEEE 802.16e/m system, etc.

1. 3GPP LTE/LTE-A System 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
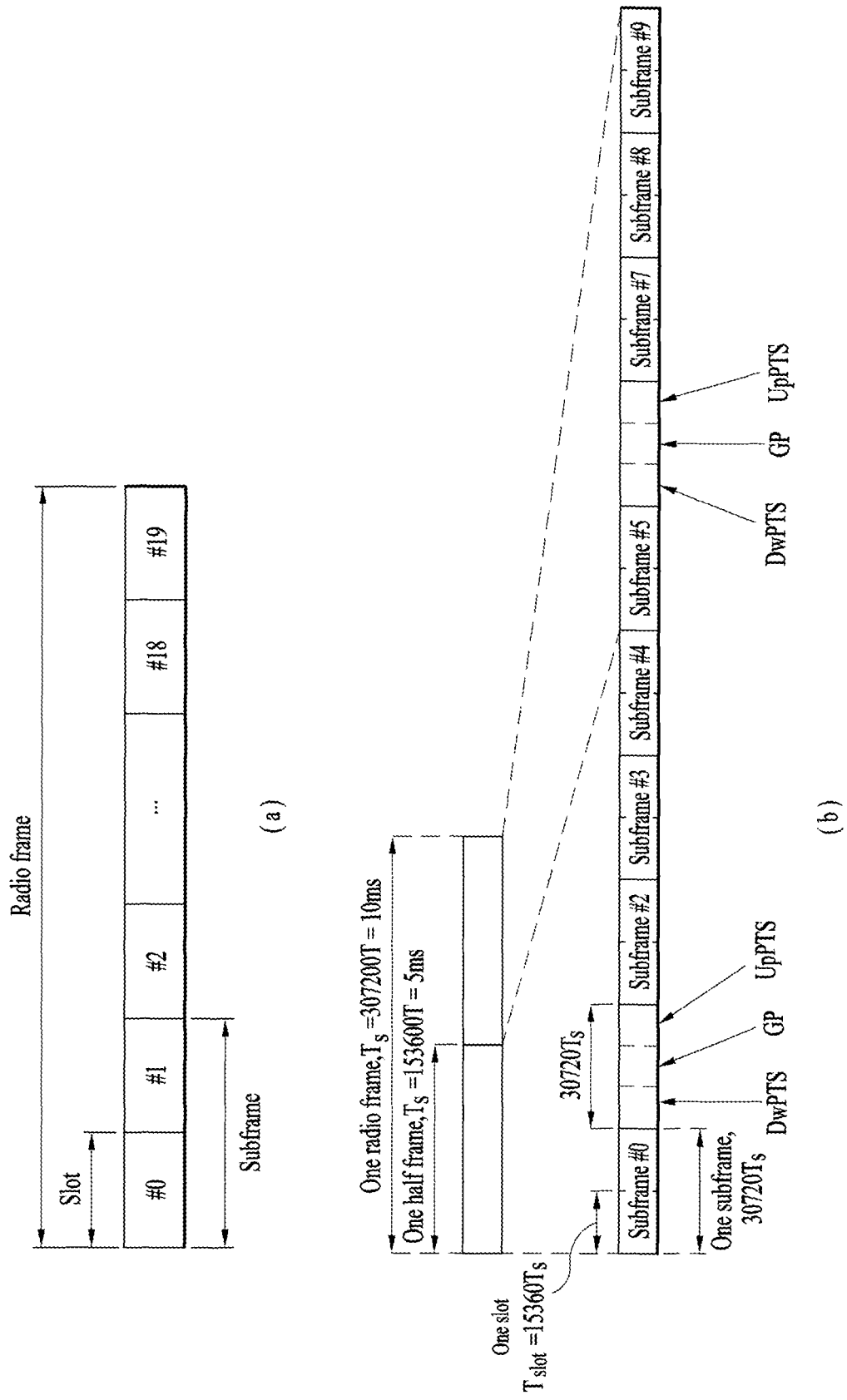
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Here, Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Here, Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

TABLE 1

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

In addition, in the LTE Rel-13 system, it is possible to newly configure the configuration of special subframes (i.e., the lengths of DwPTS/GP/UpPTS) by considering the number of additional SC-FDMA symbols, X, which is provided by the higher layer parameter named "srs-UpPtsAdd" (if this parameter is not configured, X is set to 0). In the LTE Rel-14 system, specific subframe configuration #10 is newly added. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink.)

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

Figure 3:
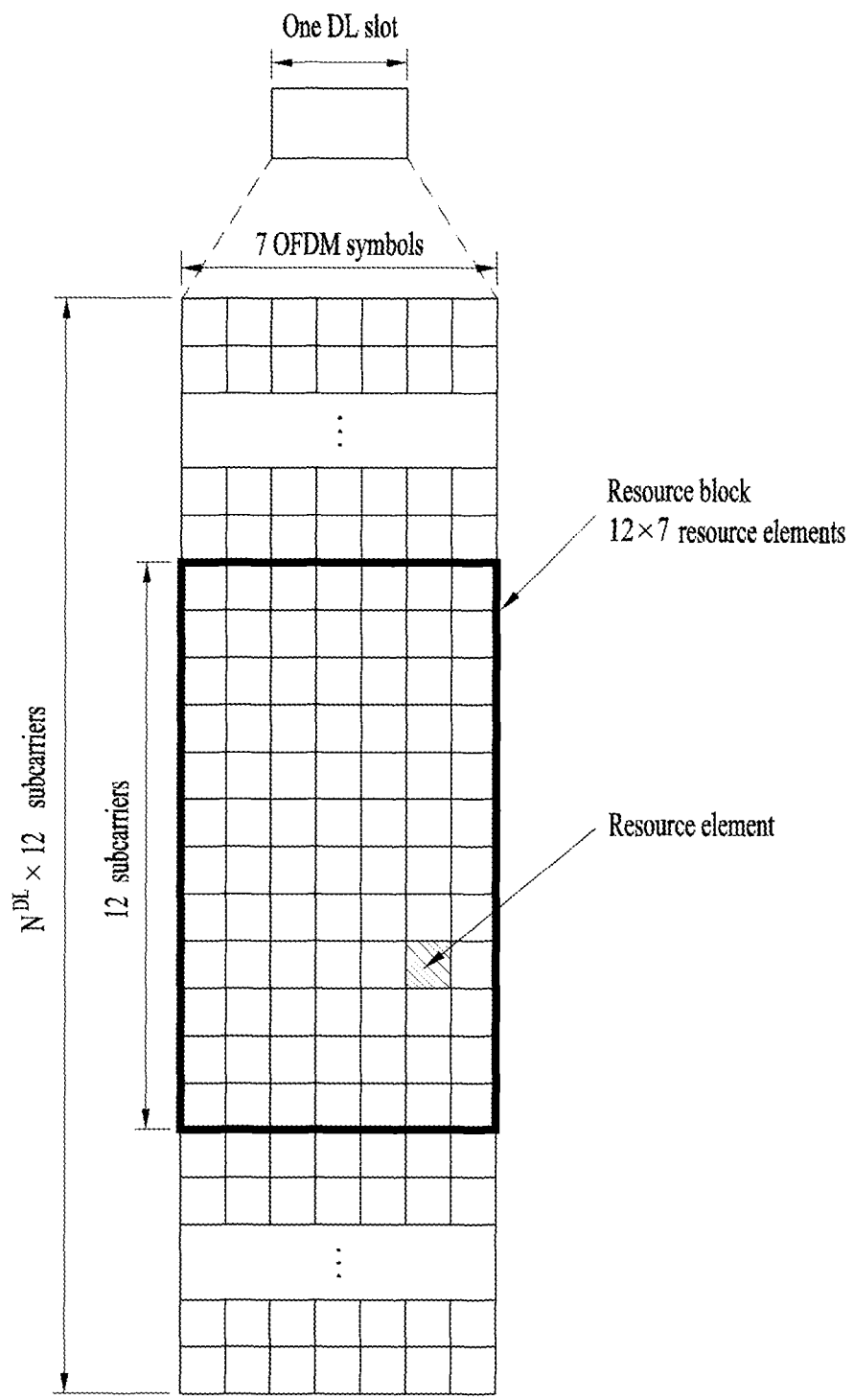
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth.

Figure 4:
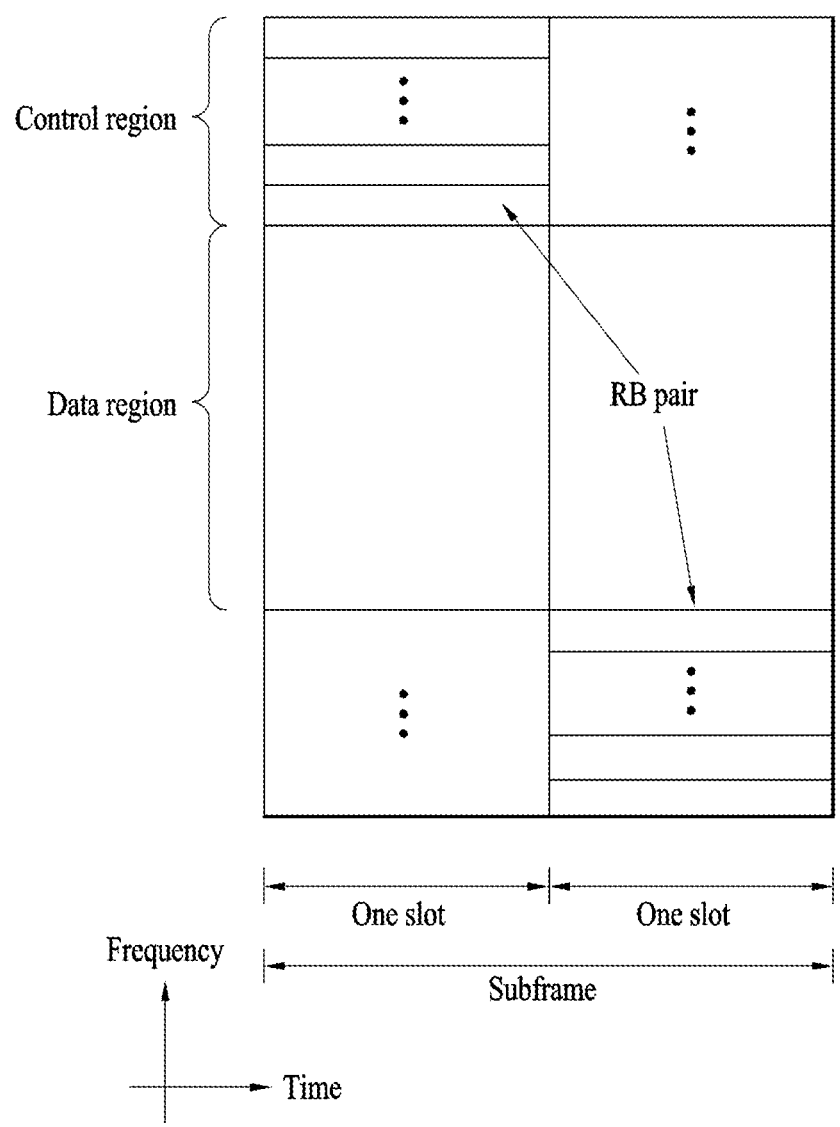
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
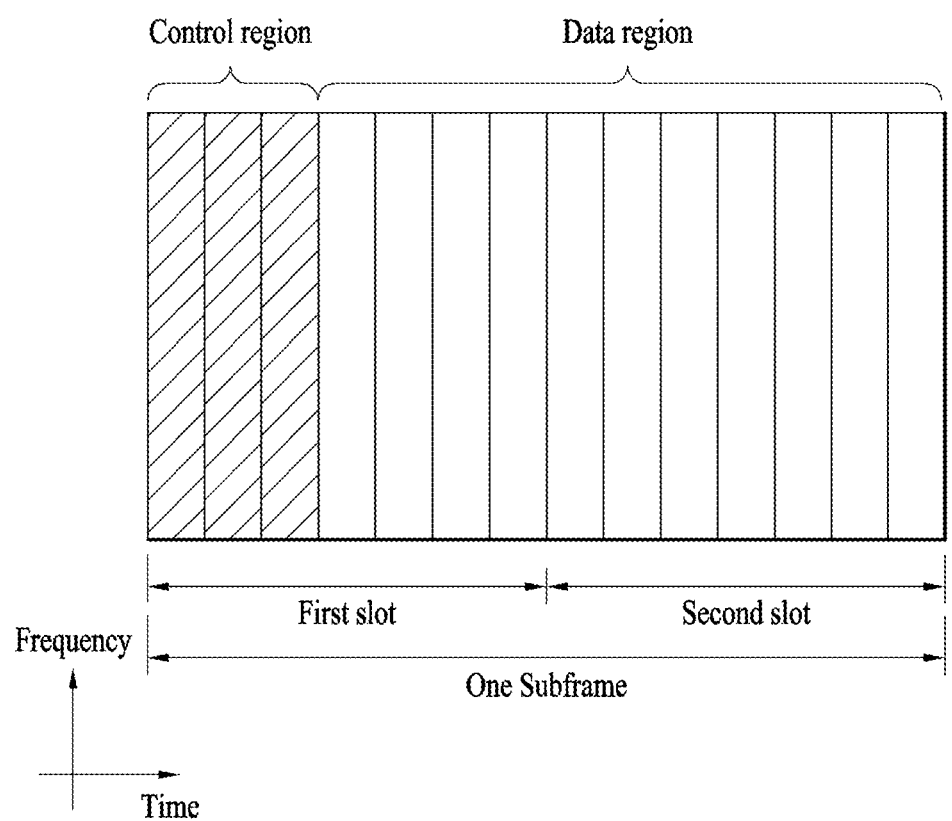
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. Quasi Co-Location (QCL)

The term "quasi co-located (QCL)" (or "quasi co-location (QCL)") is defined as follows.

If two antenna ports are QCL, a UE may assume that large-scale properties of a signal received from a first antenna port may be inferred from a signal received from another antenna port. Here, the large-scale properties may include at least one of the following properties.

Delay spread
Doppler spread
Frequency shift
Average received power
Received Timing Alternatively, the term "QCL" may be defined as follows in the present disclosure.

If two antenna ports are QCL, a UE may assume that large-scale properties of a channel over which a symbol on a first antenna port is transmitted may be inferred from a channel over which a symbol on another antenna port is transmitted. Here, the large-scale properties may include at least one of the following properties.

Delay spread
Doppler spread
Doppler shift
Average gain
Average delay
Average angle (AA)

In the present disclosure, when it is said that QCL is guaranteed between antenna ports in terms of the AA, it may mean that based on an AA estimated from specific antenna port(s), a UE is capable of receiving signal(s) transmitted from other antenna port(s) by configuring the same or similar receive (RX) beam direction (and/or RX beamwidth and/or beam sweeping) (based on the AA). In other words, if the UE operates as described above for QCL-guaranteed antenna ports, it may mean that the reception performance is guaranteed to be higher than or equal to a specific level.

Here, the AA may be referred to '(almost) dominant arrival angle'. That is, assuming that a specific dominant (arrival) angle of a signal measured from a specific antenna port is S, a specific dominant (arrival) angle of a signal measured from another antenna port where the QCL with the specific antenna port can be assumed may be estimated to be almost similar to S. When the QCL is capable of being assumed as described above, a receiver may assume that the receiver is capable of using/applying an AA estimated from a specific indicated QCL RS/SS with almost no changes, thereby achieving efficient receiver implementation/operation.

Angular Spread (AS)

In the present disclosure, when it is said that two antenna ports are QCL in terms of the AS, it may mean that an AS estimated from one antenna port is derived/estimated/applied from/to that estimated from the other antenna port.

The AS may include an azimuth AS and/or a zenith AS. The AS may be defined separately or together for each dimension. The AS may be defined separately or together from the perspective of departure and/or arrival.

In the present disclosure, when it is said that the QCL is guaranteed between two antenna ports in terms of the AS, it may mean that based on an AS estimated from specific antenna port(s), a UE is capable of receiving signal(s) transmitted from other antenna port(s) by configuring the same or similar RX beamwidth and/or beam sweeping level (and/or RX beam direction) (based on the AS). In other words, if the UE operates as described above for QCL-guaranteed antenna ports, it may mean that the reception performance is guaranteed to be higher than or equal to a specific level.

While the AA may be interpreted as a parameter indicating an average or (the most) valid/dominant beam direction, the AS may be interpreted as a parameter indicating how the beam direction is spread and received (with respect to the AA) due to the distribution of reflectors.

Power Angle(-of-Arrival) Profile (PAP)

When it is said that two antenna ports are QCL in terms of the PAP, it may mean that a PAP estimated from one antenna port is derived/estimated/applied (or quasi-derived/estimated/applied) from/to that estimated from the other antenna port.

The PAP may include an azimuth angle-domain PAP and/or a zenith angle-domain PAP. The PAP may be defined separately or together for each dimension. The PAP may be defined separately or together from the perspective of departure and/or arrival.

In the present disclosure, when it is said that the QCL is guaranteed between two antenna ports in terms of the PAP, it may mean that based on a PAP estimated from specific antenna port(s), a UE is capable of receiving signal(s) transmitted from other antenna port(s) by configuring the same or similar RX beamwidth and/or beam sweeping level (and/or RX beam direction) (based on the PAP). In other words, if the UE operates as described above for QCL-guaranteed antenna ports, it may mean that the reception performance is guaranteed to be higher than or equal to a specific level.

In the present disclosure, the above-described QCL-related definitions are not distinguished from each other. In other words, the QCL may follow one of the above-described definitions in the present disclosure. Alternatively, the QCL may have another definition, which is similar to but different from the above-described definitions. The QCL may be defined as follows: co-location transmission may be assumed between antenna ports where the QCL assumption is applicable (for example, a UE may assume that the antenna ports are at the same transmission point).

In the present disclosure, the QCL may be interpreted as a concept that covers all modifications. For convenience of description, the above QCL-related definitions are interchangeably used in the present disclosure.

In the present disclosure, a UE may not assume the same large-scale channel properties between non-quasi-co-located (non-QCL) antenna ports. Thus, in this case, a typical UE receiver may perform independent processing for each configured non-QCL antenna port in regard with timing acquisition and tracking, frequency offset estimation and compensation, delay estimation, and Doppler estimation.

The UE may perform the following operations for antenna ports where the QCL may be assumed:

Regarding Delay spread & Doppler spread, the UE may apply estimation results of power-delay-profile, delay spread, Doppler spectrum, and Doppler spread for one antenna port to a Wiener filter which is used to perform channel estimation for another port.

Regarding Frequency shift & Received Timing, the UE may perform time and frequency synchronization for one port and then apply the same synchronization to demodulation of another port.

Regarding Average received power, the UE may average reference signal received power (RSRP) measurements over two or more antenna ports.

1.4. Partial QCL

According to the present disclosure, when a partial QCL relationship is established/configured/indicated between specific antenna ports (the term "partial QCL" may be referred to as sub-QCL, fractional QCL, or quasi-sub-location (QSL), etc.), the following relationship may be supported for at least one QCL parameter(s).

For example, when it is assumed/configured/indicated that partial QCL is established between a signal (and/or a (radio) channel experienced/observed thereby) transmitted from antenna port group A (for example, there may be one or more such antenna port groups) and a signal (and/or a (radio) channel experienced/observed thereby) transmitted from antenna port group B, it may mean that QCL parameter(s)/property(-ies) for antenna port group A are assumed/applied/used as a subset of (i.e., smaller than or equal to) QCL parameter(s)/property(-ies) estimated from antenna port B (when such operation is applied, the performance is guaranteed to be higher than or equal to a specific level).

The partial QCL may be used in various environments. As a representative example, it may be considered that logical antenna port group A is formed by multiple physical antennas, which form a single frequency network (SFN), and logical antenna port group B is mapped to individual physical antennas. The example may include the following case: an antenna port in logical antenna port group A is mapped to multiple physical antennas (particularly, when each physical antenna has different large-scale properties (LSP)) such that a signals on the corresponding port is simultaneously transmitted through the multiple antennas, and an antenna port in logical antenna port group B is mapped to one of the multiple physical antennas to which antenna port group A is mapped such that a signal on the corresponding port is transmitted through the single antenna.

In the above example, a receiving end may derive the LSP of a channel to be experienced by a signal transmitted on antenna port group B based on the LSP of a channel obtained from a signal transmitted on antenna port group A.

For example, in a multipath fading channel environment, channel delays of a signal transmitted on antenna port group B may be parts of channel delays that a signal transmitted on antenna port group A experiences. Doppler channel values of the signal transmitted on antenna port group B may be part of Doppler channel values of the signal transmitted on antenna port group A.

Thus, a receiver may configure the parameters of a channel estimator for a signal received on antenna port group B based on the LSP of a signal on antenna port group A.

Further, antenna port group A and antenna port group B are in such a relationship that an RX beam direction for receiving a signal transmitted through antenna port group B belongs to RX beam directions for receiving a signal transmitted through antenna port group A.

Therefore, the receiver may search for the RX beam direction for receiving the signal transmitted through antenna port group B from the RX beam directions for receiving the signal transmitted through antenna port group A, thereby improving the speed of searching for the RX beam direction and/or reducing the complexity of reception processing.

The above-described QCL and partial QCL may be applied not only to the LTE system but also to the NR system.

2. New Radio Access Technology System

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present disclosure, the corresponding technology is referred to as the new RAT or new radio (NR) for convenience of description.

2.1. Numerologies

The NR system to which the present disclosure is applicable supports various OFDM numerologies shown in the following table. In this case, the value of µ and cyclic prefix information per carrier bandwidth part can be signaled in DL and UL, respectively. For example, the value of µ and cyclic prefix information per downlink carrier bandwidth part may be signaled though DL-BWP-mu and DL-MWP-cp corresponding to higher layer signaling. As another example, the value of µ and cyclic prefix information per uplink carrier bandwidth part may be signaled though UL-BWP-mu and UL-MWP-cp corresponding to higher layer signaling.

TABLE 3

| µ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing µ, slots may be numbered within one subframe in ascending order like $n_s^\mu \in \{0, \ldots, N_{slot}^{subframe,\mu}-1\}$ and may also be numbered within a frame in ascending order like $n_{s,f}^\mu \in \{0, \ldots, N_{slot}^{subframe,\mu}-1\}$. In this case, the number of consecutive OFDM symbols in one slot ($N_{symb}^{slot}$) may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension. Table 4 shows the number of OFDM symbols in each slot/frame/subframe in the case of the normal cyclic prefix, and Table 5 shows the number of OFDM symbols in each slot/frame/subframe in the case of the extended cyclic prefix.

TABLE 4

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| µ | $N_{symb}^{slot}$ | $N_{slot}^{frame,\mu}$ | $N_{slot}^{subframe,\mu}$ |
|---|---|---|---|
| 2 | 12 | 40 | 4 |

In the NR system to which the present disclosure can be applied, a self-contained slot structure can be applied based on the above-described slot structure.

Figure 6:
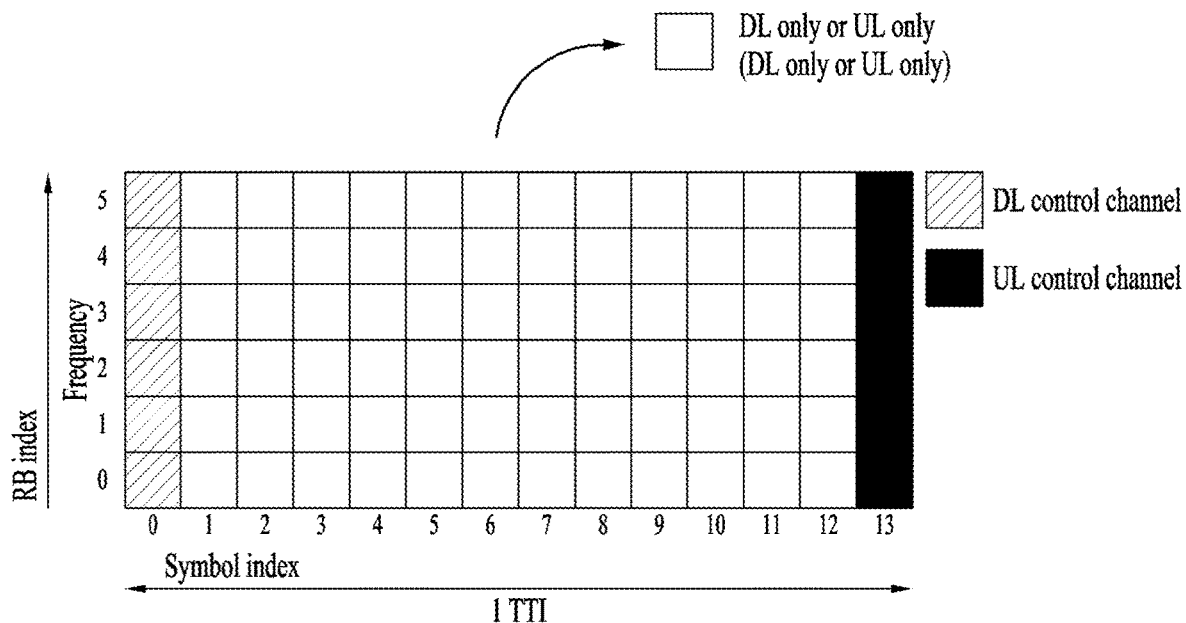
FIG. 6 is a diagram illustrating a self-contained slot structure applicable to the present disclosure.

FIG. 6 is a diagram illustrating a self-contained slot structure applicable to the present disclosure.

In FIG. 6, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the eNB and UE can sequentially perform DL transmission and UL transmission in one slot. That is, the eNB and UE can transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present disclosure may include either the DL control region or the UL control region as well as both the DL and UL control regions as shown in FIG. 6.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot. Similarly, the UE can assume that UL transmission occurs only in symbols denoted by 'U' and 'X' in the UL slot.

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
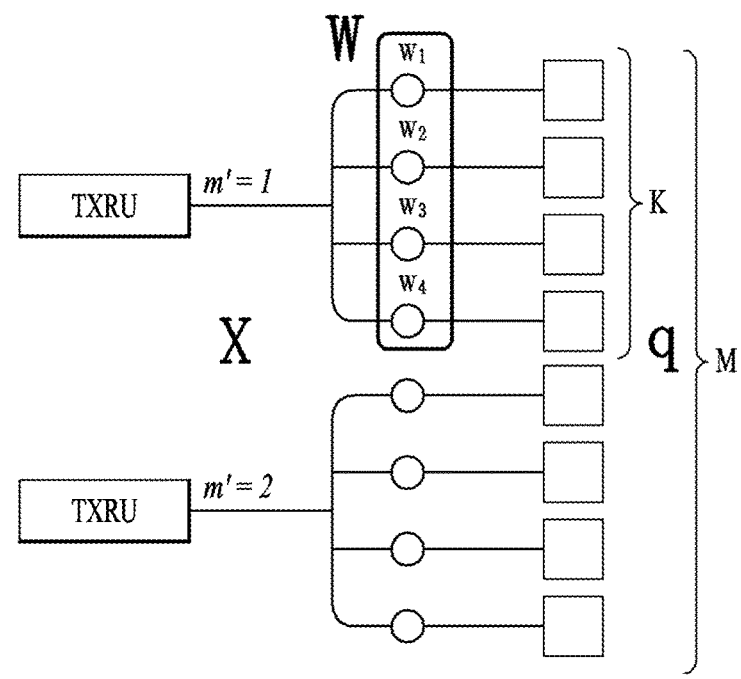
FIGS. 7 and 8 are diagrams illustrating representative connection methods for connecting TXRUs to antenna elements.
Figure 8:
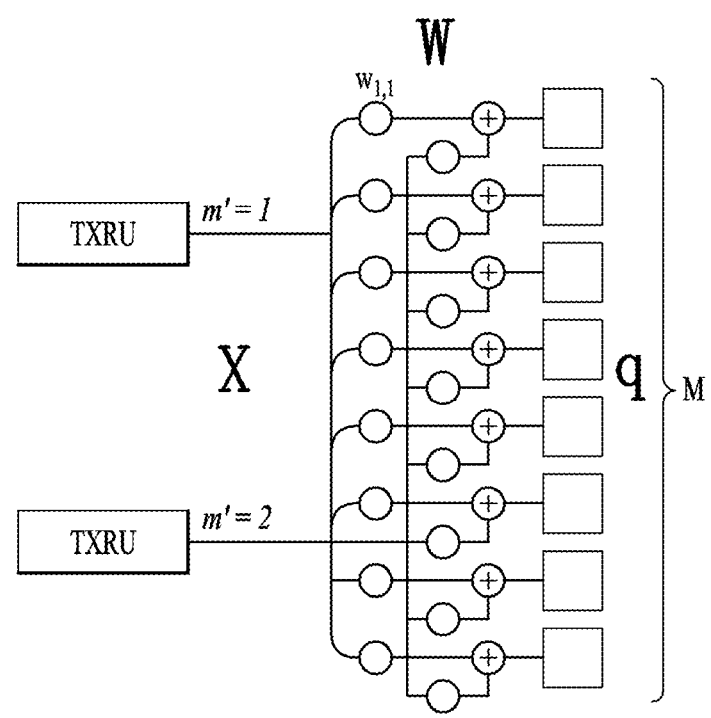

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas are used in the NR system to which the present disclosure is applicable, the hybrid beamforming method obtained by combining the digital beamforming and analog beamforming can be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure can be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 9:
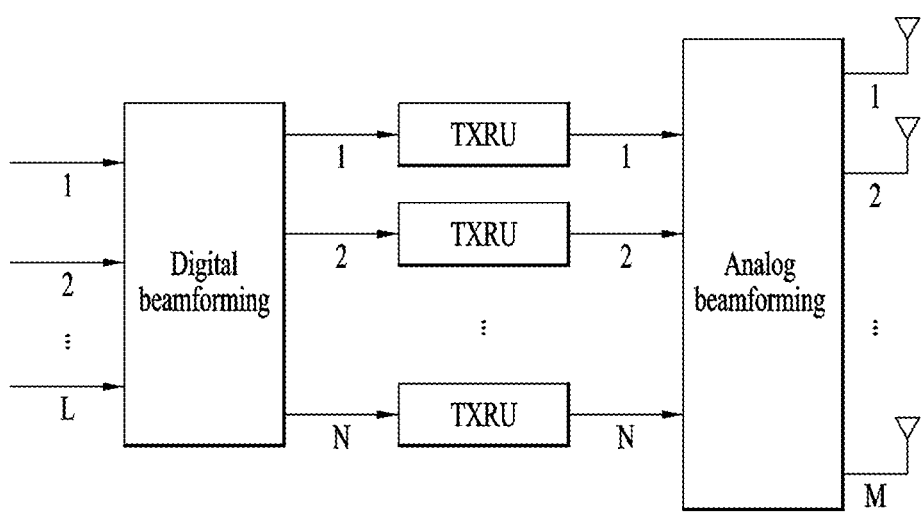
FIG. 9 is a schematic diagram illustrating a hybrid beamforming structure according to an embodiment of the present disclosure from the perspective of TXRUs and physical antennas.

FIG. 9 is a schematic diagram illustrating a hybrid beamforming structure according to an embodiment of the present disclosure from the perspective of TXRUs and physical antennas. In FIG. 9, it is assumed that the number of digital beams is L and the number of analog beams is N.

Additionally, a method for providing efficient beamforming to UEs located in a specific area by designing an eNB capable of changing analog beamforming on a symbol basis has been considered in the NR system to which the present disclosure is applicable. Further, a method of introducing a plurality of antenna panels where independent hybrid beamforming can be applied by defining N TXRUs and M RF antennas as one antenna panel has also been considered in the NR system to which the present disclosure is applicable.

When the eNB uses a plurality of analog beams as described above, each UE has a different analog beam suitable for signal reception. Thus, the beam sweeping operation where the eNB applies a different analog beam per symbol in a specific subframe (SF) (at least with respect to synchronization signals, system information, paging, etc.) and then perform signal transmission in order to allow all UEs to have reception opportunities has been considered in the NR system to which the present disclosure is applicable.

Figure 10:
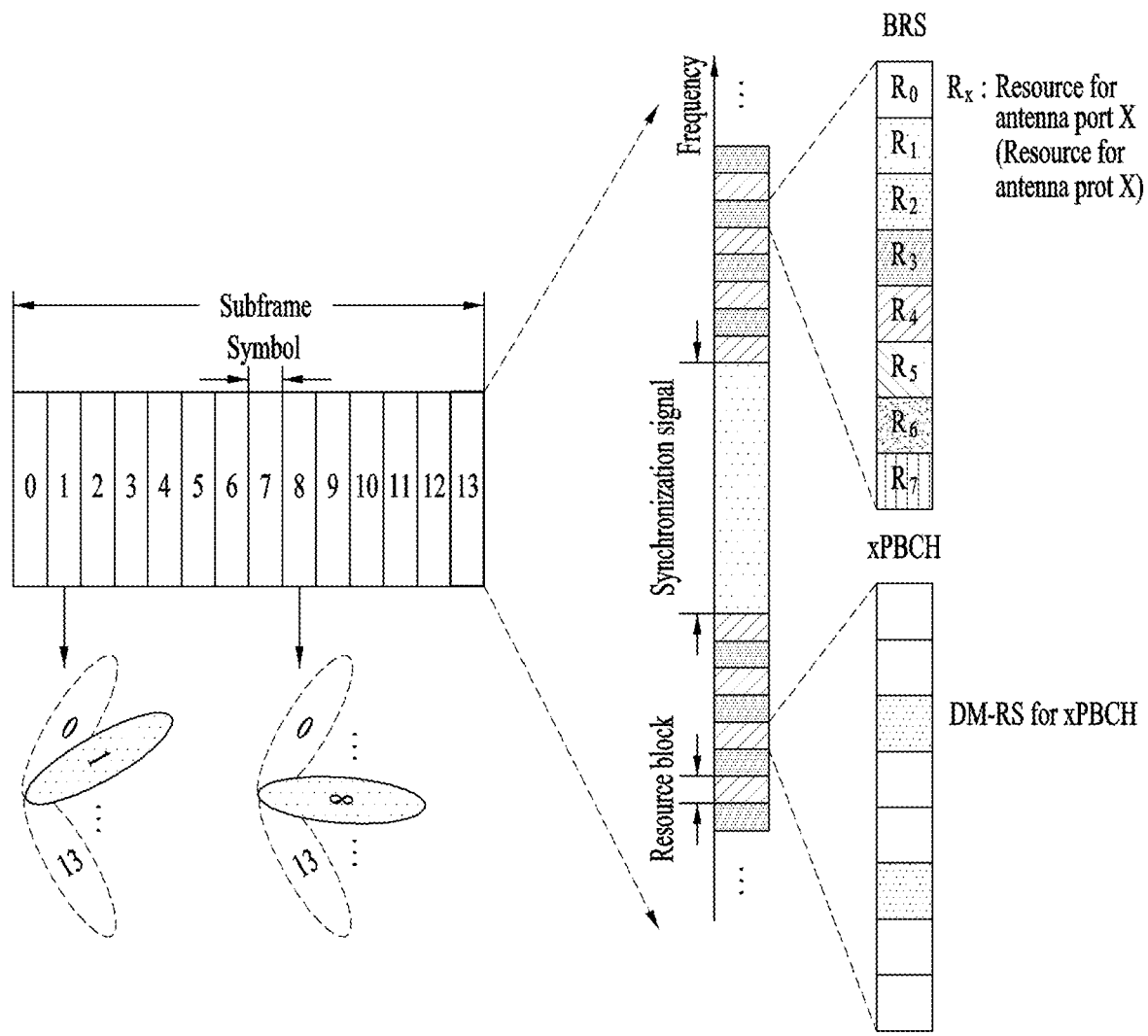
FIG. 10 is a diagram schematically illustrating the beam sweeping operation for synchronization signals and system information during a downlink (DL) transmission process according to an embodiment of the present disclosure.

FIG. 10 is a diagram schematically illustrating the beam sweeping operation for synchronization signals and system information during a downlink (DL) transmission process according to an embodiment of the present disclosure In FIG. 10, a physical resource (or channel) for transmitting system information of the NR system to which the present disclosure is applicable in a broadcasting manner is referred to as a physical broadcast channel (xPBCH). In this case, analog beams belonging to different antenna panels can be simultaneously transmitted in one symbol.

In addition, the introduction of a beam reference signal (BRS) corresponding to the reference signal (RS) to which a single analog beam (corresponding to a specific antenna panel) is applied has been discussed as the configuration for measuring a channel per analog beam in the NR system to which the present disclosure is applicable. The BRS can be defined for a plurality of antenna ports, and each BRS antenna port may correspond to a single analog beam. In this case, unlike the BRS, all analog beams in the analog beam group can be applied to the synchronization signal or xPBCH unlike the BRS to assist a random UE to correctly receive the synchronization signal or xPBCH.

3. Licensed Assisted Access (LAA) System

Hereinafter, methods for transmitting and receiving data in a carrier aggregation environment of an NR or LTE band, which is a licensed band and a unlicensed band will be described. In the embodiments of the present disclosure, the LAA system refers to a communication system (e.g., an LTE system or an NR system) that supports a CA situation of the licensed band and the unlicensed band. Here, as the unlicensed band, a WiFi band or a Bluetooth (BT) band may be used.

Here, LAA may refer to an LTE system or an NR system operating in an unlicensed band. LAA may also refer to a method for transmitting and receiving data in the unlicensed band in combination with the licensed band.

Figure 11:
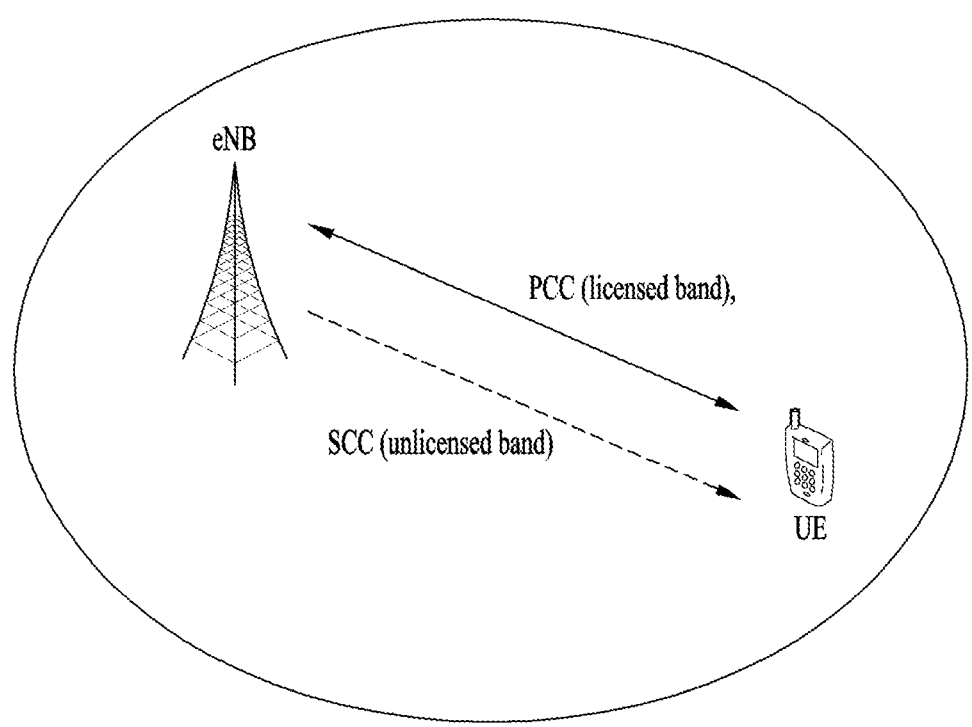
FIG. 11 is a diagram illustrating an example of a carrier aggregation (CA) environment in a wireless communication system supporting an unlicensed band.

FIG. 11 is a diagram illustrating an example of a CA environment in a wireless communication system supporting an unlicensed band.

Hereinafter, for simplicity, it is assumed that the UE is configured to perform wireless communication in each of the licensed band and the unlicensed band using two component carriers (CCs). Of course, the following methods may be applied even when three or more CCs are configured for the UE.

In the embodiments of the present disclosure, it is assumed that a licensed CC (LCC) is a primary CC (which may be called a PCC or a PCell) and an unlicensed CC (UCC) is a secondary CC (which may be called a SCC or SCell). The embodiments of the present disclosure are also be applicable even to a situation in which multiple licensed bands and multiple unlicensed bands are used in a carrier aggregation manner. Further, the proposed schemes of the present disclosure are applicable not only to the 3GPP LTE system and the 3GPP NR system but also to systems having other characteristics.

FIG. 11 illustrates a case where one BS supports both the licensed band and the unlicensed band. That is, the UE may transmit/receive control information and data via a PCC, which is a licensed band, and also transmit/receive control information and data via the SCC, which is an unlicensed band. The situation shown in FIG. 11 is merely one example, and the embodiments of the present disclosure are applicable even to a CA environment where one UE accesses multiple BSs.

For example, the UE may configure a PCell with a macro BS (a Macro eNB (M-eNB) or a Macro gNB (M-gNB)), and may configure an SCell with a small BS (a Small eNB (S-eNB) or a Small gNB (S-gNB)). In this case, the macro BS and the small BS may be connected over a backhaul network.

In embodiments of the present disclosure, the unlicensed band may be operated according to a contention-based random access scheme. In this case, channel access procedures for LAA are performed as follows.

3.1. Downlink Channel Access Procedures

An eNB operating LAA Scell(s) (or an unlicensed band) shall perform the downlink channel access procedure (CAP) described below for cell(s) in which the LAA Scell(s) transmission(s) are performed.

3.1.1. Channel access procedure for transmission(s) including
PDSCH/PDCCH/EPDCCH The eNB may transmit a transmission including PDSCH/PDCCH/EPDCCH on a carrier on which LAA Scell(s) transmission(s) are performed, after first sensing the channel to be idle during the slot durations of a defer durationTd; and after the counter N is zero in step 4 below. The counter N is adjusted by sensing the channel for additional slot duration(s) according to the steps below:

1) set N=Ninit, where Ninit is a random number uniformly distributed between 0 and CWp, and go to step 4;
2) if N>0 and the eNB chooses to decrement the counter, set N=N−1;
3) sense the channel for an additional slot duration, and if the additional slot duration is idle, go to step 4; else, go to step 5;
4) if N=0, stop; else, go to step 2;
5) sense the channel until a busy slot is detected in an additional defer duration Td or all the slots of the additional defer duration Td are detected to be idle;
6) if the channel is sensed to be idle during all the slot durations of the additional defer duration Td, go to step 4; else, go to step 5.

The CAP for transmission including PDSCH/PDCCH/EPDCCH of the eNB described above may be summarized as follows.

Figure 12:
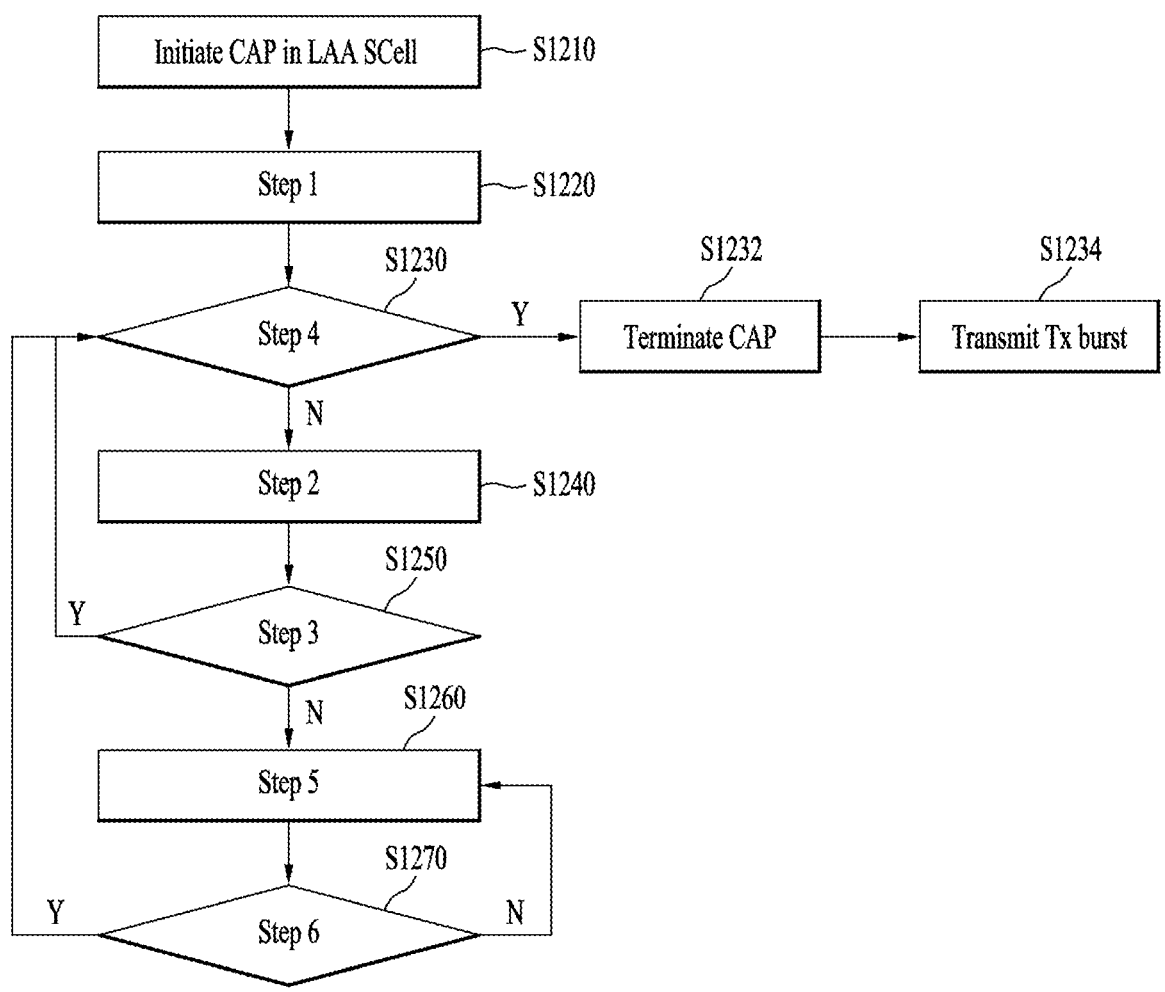
FIG. 12 is a diagram illustrating a channel access procedure (CAP) for unlicensed band transmission applicable to the present disclosure.

FIG. 12 is a diagram illustrating a CAP for unlicensed band transmission applicable to the present disclosure.

For a downlink transmission, a transmission node (e.g., an eNB) may initiate a channel access procedure (CAP) to operate in the LAA Scell(s), which are unlicensed band cells (S1210).

The eNB may randomly select a backoff counter N within the contention window CW according to step 1. At this time, N is set to an initial value Ninit (S1220). Ninit is selected as any value from among the values between 0 and CWp.

Next, if the backoff counter value N is 0 in step 4 (S1230; Y), the eNB terminates the CAP (S1232). Then, the eNB may perform Tx burst transmission including PDSCH/PDCCH/EPDCCH (S1234). On the other hand, if the backoff counter value is not 0 (S1230; N), the eNB decrements the backoff counter value by 1 according to step 2 (S1240).

Then, the eNB checks whether the channel of the LAA SCell(s) is idle (S1250). If the channel is idle (S1250; Y), the BS checks whether the backoff counter value is 0 (S1230).

On the contrary, if the channel is not idle in operation S1250 (S1250; N), namely, if the channel is busy, the eNB checks whether the channel is idle during a defer duration Td (25 usec or more) longer than the slot time (e.g., 9 usec) (S1262). If the channel is idle during the defer duration (S1270; Y), the eNB may resume the CAP.

For example, when the backoff counter value Ninit is 10 and it is determined that the channel is busy after the backoff counter value is decreased to 5, the eNB senses the channel during the defer duration to determine whether the channel is idle. If the channel is idle during the defer duration, the eNB may perform the CAP again from the backoff counter value 5 (or 4 after decrementing the backoff counter value by 1) instead of setting the backoff counter value Ninit.

On the other hand, if the channel is busy during the defer duration (S1270; N), the eNB re-performs operation S1260 and checks again whether the channel is idle during a new defer duration.

If an eNB has not transmitted a transmission including PDSCH/PDCCH/EPDCCH on a carrier on which LAA Scell(s) transmission(s) are performed after step 4 in the procedure above, the eNB may transmit a transmission including PDSCH/PDCCH/EPDCCH on the carrier if the following conditions are met:

the channel is sensed to be idle at least in a slot duration Tsl when the eNB is ready to transmit PDSCH/PDCCH/EPDCCH; and the channel has been sensed to be idle during all the slot durations of a defer duration Td immediately before this transmission.

If the channel has not been sensed to be idle in a slot duration Tsl when the eNB senses the channel after it is ready to transmit, or if the channel has been sensed to be not idle during any of the slot durations of a defer duration Td immediately before the intended transmission, the eNB proceeds to step 1 after sensing the channel to be idle during the slot durations of a defer duration Td.

The defer duration Td consists of duration Tf (=16 us) immediately followed by mp consecutive slot durations where each slot duration Tsl is 9 us, and Tf includes an idle slot duration Tsl at the start of Tf.

A slot duration Tsl is considered to be idle if the eNB senses the channel during the slot duration Tsl, and the power detected by the eNB for at least 4 us in the slot duration is less than energy detection threshold XThresh. Otherwise, the slot duration Tsl is considered to be busy.

$CW_{min,p} \leq CW_p \leq CW_{max,p}$ is the contention window. $CW_p$ adjustment is described in detail in sub clause 3.1.3.

$CW_{min,p}$ and $CW_{max,p}$ chosen before step 1 of the procedure above.

$m_p$, $CW_{min,p}$, and $CW_{max,p}$ and are based on channel access priority class associated with the eNB transmission (see Table 6 below).

$X_{Thresh}$ is adjusted as described in sub clause 3.1.4.

TABLE 6

| Channel Access Priority Class (p) | $m_p$ | $CW_{min, p}$ | $CW_{max, p}$ | $R_{mcot, p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

If the eNB transmits discovery signal transmission(s) not including PDSCH/PDCCH/EPDCCH when N>0 in the procedure above, the eNB shall not decrement the counter N during the slot duration(s) overlapping with the discovery signal transmission.

The eNB shall not perform continuous transmission on a carrier on which the LAA Scell(s) transmission(s) are performed, for a period exceeding Tmcot,p as given in Table 6.

For p=3 and p=4 in Table 6, if the absence of any other technology sharing the carrier can be guaranteed on a long term basis (e.g., by level of regulation), Tmcot,p is set to 10 ms. Otherwise, Tmcot,p is set to 8 ms.

3.1.2. Channel Access Procedure for Transmissions Including Discovery Signal Transmission(s) and not Including PDSCH An eNB may transmit a transmission including discovery signal but not including PDSCH on a carrier on which LAA Scell(s) transmission(s) are performed immediately after sensing the channel to be idle for at least a sensing interval Tdrs=25 us and if the duration of the transmission is less than 1 ms. Here, Tdrs consists of a duration Tf (=16 us) immediately followed by one slot duration Tsl=9 us. Tf includes an idle slot duration Tsl at the start of Tf. The channel is considered to be idle for Tdrs, if it is sensed to be idle during the slot durations of Tdrs.

3.1.3. Contention Window Adjustment Procedure

If the eNB transmits transmissions including PDSCH that are associated with channel access priority class p on a carrier, the eNB maintains the contention window value CWp and adjusts CWp before step 1 of the procedure (i.e., before the CAP) described in sub clause 3.1.1 for those transmissions using the following steps:

1> for every priority class p∈{1,2,3,4}, set $CW_p = CW_{min,p}$;

2> if at least Z=80% of HARQ-ACK values corresponding to PDSCH transmission(s) in reference subframe k are determined as NACK, increase CWp for every priority class p∈ {1,2,3,4} to the next higher allowed value and remain in step 2; otherwise, go to step 1.

In other words, if the probability that the HARQ-ACK values corresponding to the PDSCH transmission(s) in reference subframe k are determined as NACK is at least 80%, the eNB increases the CW values set for each priority class to the next higher priority class. Alternatively, the eNB maintains the CW values set for each priority class as initial values.

Here, reference subframe k is the starting subframe of the most recent transmission on the carrier made by the eNB, for which at least some HARQ-ACK feedback is expected to be available.

The eNB shall adjust the value of CWp for every priority class p∈{1,2,3,4} based on a given reference subframe k only once.

If $CW_p = CW_{max,p}$, the next higher allowed value for adjusting CWp is $CW_{max,p}$.

The probability Z that the HARQ-ACK values corresponding to PDSCH transmission(s) in reference subframe k are determined as NACK may be determined in consideration of the followings:

if the eNB transmission(s) for which HARQ-ACK feedback is available start in the second slot of subframe k, HARQ-ACK values corresponding to PDSCH transmission(s) in subframe k+1 are also used in addition to the HARQ-ACK values corresponding to PDSCH transmission(s) in subframe k.

if the HARQ-ACK values correspond to PDSCH transmission(s) on an LAA SCell that are assigned by (E)PDCCH transmitted on the same LAA SCell, if no HARQ-ACK feedback is detected for a PDSCH transmission by the eNB, or if the eNB detects 'DTX', 'NACK/DTX' or 'any' state, it is counted as NACK.

if the HARQ-ACK values correspond to PDSCH transmission(s) on an LAA SCell that are assigned by (E)PDCCH transmitted on another LAA cell, if the HARQ-ACK feedback for a PDSCH transmission is detected by the eNB, 'NACK/DTX' or 'any' state is counted as NACK, and 'DTX' state is ignored.

if no HARQ-ACK feedback is detected for a PDSCH transmission by the eNB, if PUCCH format 1 with channel selection is expected to be used by the UE, 'NACK/DTX' state corresponding to 'no transmission' is counted as NACK, and 'DTX' state corresponding to 'no transmission' is ignored. Otherwise, the HARQ-ACK for the PDSCH transmission is ignored.

if a PDSCH transmission has two codewords, the HARQ-ACK value of each codeword is considered separately.

bundled HARQ-ACK across M subframes is considered as M HARQ-ACK responses.

If the eNB transmits transmissions including PDCCH/ EPDCCH with DCI format 0A/0B/4A/4B and not including PDSCH that are associated with channel access priority class p on a channel starting from time t0, the eNB maintains the contention window value CWp and adjusts CWp before step 1 of the procedure described in sub clause 3.1.1 for those transmissions (i.e., before performing the CAP) using the following steps:

1> for every priority class p∈{1,2,3,4}, set $CW_p = CW_{min,p}$;

2> if less than 10% of the UL transport blocks scheduled by the eNB using Type 2 channel access procedure (described in sub clause 3.2.1.2) in the time interval between t0 and t0+TCO have been received successfully, increase CWp for every priority class p∈{1,2,3,4} to the next higher allowed value and remain in step 2; otherwise, go to step 1.

Here, TCO is calculated as described is computed as described in subclause 3.2.1.

If the $CW_p=CW_{max,p}$ is consecutively used K times for generation of Ninit, CWp is reset to CWmin,p only for that priority class p for which $CW_p=CW_{max,p}$ is consecutively used K times for generation of Ninit. K is selected by the eNB from the set of values {1, 2, . . . , 8} for each priority class p∈{1,2,3,4}.

3.1.4. Energy Detection Threshold Adaptation Procedure

An eNB accessing a carrier on which LAA Scell(s) transmission(s) are performed, shall set the energy detection threshold (XThresh) to be less than or equal to the maximum energy detection threshold XThresh_max.

The maximum energy detection threshold XThresh_max is determined as follows:
if the absence of any other technology sharing the carrier can be guaranteed on a long term basis (e.g., by level of regulation), then:

$$X_{Thresh\_max} = \min\left\{\begin{array}{l} T_{max} + 10 \text{ dB,} \\ X_r \end{array}\right\},$$

where Xr is the energy detection threshold defined by regulatory requirements in dBm when such requirements are defined, otherwise $X_r=T_{max}+10$ dB.

Otherwise, $$X_{Thres\_max} = \max\left\{\begin{array}{l} -72 + 10 \cdot \log 10(BWMHz/20 \text{ MHz}) \text{ dBm,} \\ \min\left\{\begin{array}{l} T_{max}, \\ T_{max} - T_A + (P_H + 10 \cdot \log 10(BWMHz/20 \text{ MHz}) - P_{TX}) \end{array}\right\} \end{array}\right\},$$

where each variable is defined as follows:
$T_A=10$ dB for transmission(s) including PDSCH;
$T_A=5$ dB for transmissions including discovery si transmission(s) and not including PDSCH;
$P_H=23$ dBm;
$P_{TX}$ is the set maximum eNB output power dBm for the carrier;
eNB uses the set maximum Transmission power over a single carrier irrespective of whether single carrier or multi-earner transmission is employed
$T_{max}(dBm)=10\cdot\log 10(3.16228\cdot 10^{-8}$ (mW/MHz)· BWMHz (MHz));
BWMHz is the single carrier bandwidth in MHz.

3.1.5. Channel Access Procedure for Transmission(s) on Multiple Carriers

An eNB can access multiple carriers on which LAA Scell(s) transmission(s) are performed, according to one of the Type A or Type B procedures described below.

3.1.5.1. Type A Multi-Carrier Access Procedures

The eNB shall perform channel access on each carrier $c_i \in C$, according to the procedures described in this subclause, where C is a set of carriers on which the eNB intends to transmit, and i=0, 1, . . . q−1, and q is the number of carriers on which the eNB intends to transmit.

The counter N described in subclause 3.1.1 (i.e., the counter N considered in the CAP) is determined for each carrier $c_i$ and is denoted as $N_{c_i}$. $N_{c_i}$ is maintained according to subclause 3.1.5.1.1 or 3.1.5.1.2 below.

3.1.5.1.1. Type A1

Counter N as described in subclause 3.1.1 (i.e., the counter N considered in the CAP) is independently determined for each carrier $c_i$ and is denoted as $N_{c_i}$.

If the absence of any other technology sharing the carrier can be guaranteed on a long term basis (e.g., by level of regulation), when the eNB ceases transmission on any one carrier $c_j \in C$, for each carrier $c_i$ (where $c_i \neq c_j$), the eNB can resume decrementmg $N_{c_i}$ when idle slots are detected either after waiting for a duration of $4\cdot T_{sl}$, or after reinitialising $N_{c_i}$.

3.1.5.1.2. Type A2

Counter N is determined as described in subclause 3.1.1 for each carrier $c_j \in C$, and is denoted as $N_{c_j}$, where $c_j$ may be the carrier that has the largest CWp value. For each carrier $c_i$, $N_{c_i}=N_{c_j}$.

When the eNB ceases transmission on any one carrier for which $N_{c_i}$ is determined, the eNB shall reinitialise $N_{c_i}$ for all carriers.

3.1.5.2. Type B Multi-Carrier Access Procedure

A carrier $c_j \in C$ is selected by the eNB as follows:
the eNB selects $c_j$ by uniformly randomly choosing $c_j$ from C before each transmission on multiple carriers $c_i \in C$; or
the eNB selects $c_j$ no more frequently than once every 1 second,
where C is a set of carriers on which the eNB intends to transmit, i=0, 1, . . . q−1, and q is the number of carriers on which the eNB intends to transmit.

To transmit on carrier $c_j$, the eNB shall perform channel access on carrier $c_j$ according to the procedures described in subclause 3.1.1 with the modifications described in 3.1.5.2.1 or 3.1.5.2.2.

To transmit on carrier $c_i \neq c_j$, $c_i \in C$,
for each carrier $c_i$, the eNB shall sense the carrier $c_i$ for at least a sensing interval $T_{mc}=25$ us immediately before the transmitting on carrier $c_j$. And the eNB may transmit on carrier $c_i$ immediately after sensing the carrier $c_i$ to be idle for at least the sensing interval $T_{mc}$. The carrier $c_i$ is considered to be idle for $T_{mc}$ if the channel is sensed to be idle during all the time durations in which such idle sensing is performed on the carrier $c_j$ in given interval $T_{mc}$.

The eNB shall not continuously transmit on a carrier $c_i \neq c_j$ (where $c_i \in C$) for a period exceeding Tmcot,p as given in Table 6, where the value of Tmcot,p is determined using the channel access parameters used for carrier $c_j$.

3.1.5.2.1 Type B1

A single CWp value is maintained for the set of carriers C.

For determining CWp for channel access on carrier $c_j$, step 2 of the procedure described in sub clause 3.1.3 is modified as follows:
if at least Z=80% of HARQ-ACK values corresponding to PDSCH transmission(s) in reference subframe k of all carriers $c_i \in C$ are determined as NACK, increase CWp for every priority class p∈{1,2,3,4} to the next higher allowed value; otherwise, go to step 1.

3.1.5.2.2. Type B2

A CWp value is maintained independently for each carrier $c_i \in C$ using the procedure described in subclause 3.1.3. For determining Ninit for carrier $c_j$, CWp value of carrier $c_{j1} \in C$ is used, where $c_{j1}$ is the carrier with the largest CWp among all carriers in set C.

3.2. Uplink Channel Access Procedures

A UE and an eNB scheduling UL transmission(s) for the UE shall perform the procedures described below to access the channel(s) on which the LAA Scell(s) transmission(s) are performed.

3.2.1. Channel Access Procedure for Uplink Transmission (s)

The UE can access a carrier on which LAA Scell(s) UL transmission(s) are performed according to one of Type 1 or Type 2 UL channel access procedures. Type 1 channel access procedure is described in sub clause 3.2.1.1 below. Type 2 channel access procedure is described in sub clause 3.2.1.2 below.

If an UL grant scheduling a PUSCH transmission indicates Type 1 channel access procedure, the UE shall use Type 1 channel access procedure for transmitting transmissions including the PUSCH transmission unless stated otherwise in this sub clause.

If an UL grant scheduling a PUSCH transmission indicates Type 2 channel access procedure, the UE shall use Type 2 channel access procedure for transmitting transmissions including the PUSCH transmission unless stated otherwise in this sub clause.

The UE shall use Type 1 channel access procedure for SRS (Sounding Reference Signal) transmissions not including a PUSCH transmission. UL channel access priority class p=1 is used for SRS transmissions not including a PUSCH.

TABLE 7

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulmcot,p}$ = 10 ms if the higher layer parameter 'absenceOfAnyOtherTechnology-r14' indicates TRUE, otherwise, $T_{ulmcot,p}$ = 6 ms.

NOTE 2:
When $T_{ulmcot,p}$ = 6 ms it may be increased to 8 ms by inserting one or more gaps. The minimum duration of a gap shall be 100 μs. The maximum duration before including any such gap shall be 6 ms.

If the 'UL configuration for LAA' field configures an 'UL offset' 1 and an 'UL duration' d for subframe n, then the UE may use channel access Type 2 for transmissions in subframes n+1+i (where i=0, 1, ... d−1) if the end of UE transmission occurs in or before subframe n+1+d−1.

If the UE scheduled to transmit transmissions including PUSCH in a set of subframes $n_0, n_1, \ldots, n_{w-1}$ using PDCCH DCI format 0B/4B, and if the UE cannot access the channel for a transmission in subframe $n_k$, the UE shall attempt to make a transmission in subframe $n_{k+1}$ according to the channel access type indicated in the DCI, where k∈{0, 1, . . . w−2} and w is the number of scheduled subframes indicated in the DCI.

If the UE is scheduled to transmit transmissions without gaps including PUSCH in a set of subframes $n_0, n_1, \ldots, n_{w-1}$ using one or more PDCCH DCI format 0A/0B/4A/4B and the UE performs a transmission in subframe $n_k$ after accessing the carrier according to one of Type 1 or Type 2 channel access procedures, the UE may continue transmission in subframes after $n_k$ where k∈{0, 1, . . . w−1}.

If the beginning of UE transmission in subframe n+1 immediately follows the end of UE transmission in subframe n, the UE is not expected to be indicated with different channel access types for the transmissions in those subframes.

If the UE is scheduled to perform transmission without gaps in subframes $n_0, n_1, \ldots, n_{w-1}$ using one or more PDCCH DCI format 0A/0B/4A/4B, and if the UE has stopped transmitting during or before subframe $n_{k1}$, where k1∈{0, 1, . . . w−2}, and if the channel is sensed by the UE to be continuously idle after the UE has stopped transmitting, the UE may transmit in a later subframe $n_{k2}$, where k2∈{1, . . . w−1}, using Type 2 channel access procedure. If the channel sensed by the UE is not continuously idle after the UE has stopped transmitting, the UE may transmit in a later subframe $n_{k2}$, where k2∈{1, . . . w−1} using Type 1 channel access procedure with the UL channel access priority class indicated in the DCI corresponding to subframe $n_{k2}$.

If the UE receives an UL grant and the DCI indicates a PUSCH transmission starting in subframe n using Type 1 channel access procedure, and if the UE has an ongoing Type 1 channel access procedure before subframe n:

if the UL channel access priority class value p1 used for the ongoing Type 1 channel access procedure is same or larger than the UL channel access priority class value p2 indicated in the DCI, the UE may transmit the PUSCH transmission in response to the UL grant by accessing the carrier by using the ongoing Type 1 channel access procedure;

if the UL channel access priority class value p1 used for the ongoing Type 1 channel access procedure is smaller than the UL channel access priority class value p2 indicated in the DCI, the UE shall terminate the ongoing channel access procedure.

If the UE is scheduled to transmit on a set of carriers C in subframe n, and if the UL grants scheduling PUSCH transmissions on the set of carriers C indicate Type 1 channel access procedure, and if the same 'PUSCH starting position' is indicated for all carriers in the set of carriers C, and if the carrier frequencies of the set of carriers C is a subset of one of the sets of predefined carrier frequencies, the UE may transmit on carrier $c_i$∈C using Type 2 channel access procedure.

if Type 2 channel access procedure is performed on carrier $c_i$ immediately before the UE transmission on carrier $c_j$∈C, where i≠j, and if the UE has accessed carrier $c_j$ using Type 1 channel access procedure, carrier $c_j$ is selected by the UE uniformly randomly from the set of carriers C before performing Type 1 channel access procedure on any carrier in the set of carriers C.

A BS may indicate Type 2 channel access procedure in the DCI of an UL grant scheduling transmission(s) including PUSCH on a carrier in subframe n when the BS has transmitted on the carrier according to the channel access procedure described in clause 3.1.1.

Alternatively, a BS may indicate using the 'UL Configuration for LAA' field that the UE may perform a Type 2 channel access procedure for transmissions(s) including PUSCH on a carrier in subframe n when the BS has transmitted on the carrier according to the channel access procedure described in clause 3.1.1.

Alternatively, a BS may schedule transmissions including PUSCH on a carrier in subframe n, that follows a transmission by the BS on that carrier with a duration of $T_{short\_u1}$=25 us, subframe n occurs within the time interval starting at t0 and ending at t0+TCO, where $T_{CO}=T_{mcot,p}+T_g$, where each variable may be defined as follows:

t0 is the time instant when the BS has started transmission;

T mcot,p is determined by the BS as described in clause 3.1;

Tg is the total duration of all gaps of duration greater than 25 us that occur between the DL transmission of the BS and UL transmissions scheduled by the BS, and between any two UL transmissions scheduled by the BS starting from t0.

The BS shall schedule UL transmissions between t0 and t0+TCO in contiguous subframes if they can be scheduled contiguously.

For an UL transmission on a carrier that follows a transmission by the BS on that carrier within a duration of $T_{short\_ul}=25$ us, the UE may use Type 2 channel access procedure for the UL transmission.

If the BS indicates Type 2 channel access procedure for the UE in the DCI, the BS indicates the channel access priority class used to obtain access to the channel in the DCI.

3.2.1.1. Type 1 UL channel access procedure

The UE may perform the transmission using Type 1 channel access procedure after sensing the channel to be idle during the slot durations of a defer duration Td; and after the counter N is zero in step 4. The counter N is adjusted by sensing the channel for additional slot duration(s) according to the steps described below:

1) set N=Ninit, where Ninit is a random number uniformly distributed between 0 and CWp, and go to step 4;

2) if N>0 and the UE chooses to decrement the counter, set N=N−1;

3) sense the channel for an additional slot duration, and if the additional slot duration is idle, go to step 4; else, go to step 5;

4) if N=0, stop; else, go to step 2;

5) sense the channel until either a busy slot is detected within an additional defer duration Td or all the slots of the additional defer duration Td are detected to be idle;

6) if the channel is sensed to be idle during all the slot durations of the additional defer duration Td, go to step 4; else, go to step 5.

In brief, Type 1 UL CAP of the UE described above may be summarized as follows.

For uplink transmissions, a transmission node (e.g., a UE) may initiate a channel access procedure (CAP) to operate in the LAA Scell(s), which are unlicensed band cells (S1210).

The UE may randomly select a backoff counter N within the contention window CW according to step 1. At this time, N is set to an initial value Ninit (S1220). Ninit is selected as any value among the values between 0 and CWp.

Next, if the backoff counter value N is 0 in step 4 (S1230; Y), the UE terminates the CAP (S1232). Then, the eNB may perform a Tx burst transmission (S1234). On the other hand, if the backoff counter value is not 0 (S1230; N), the UE decrements the backoff counter value by 1 according to step 2 (S1240).

Then, the UE checks whether the channel of the LAA SCell(s) is idle (S1250). If the channel is idle (S1250; Y), the BS checks whether the backoff counter value is 0 (S1230).

On the contrary, if the channel is not idle in operation S1250 (S1250; N), namely, if the channel is busy, the UE checks whether the channel is idle during a defer duration Td (25 usec or more) longer than the slot time (e.g., 9 usec) (S1262). If the channel is idle during the defer duration (S1270; Y), the UE may resume the CAP.

For example, when the backoff counter value Ninit is 10 and it is determined that the channel is busy after the backoff counter value is decreased to 5, the UE senses the channel during the defer duration to determine whether the channel is idle. If the channel is idle during the defer duration, the UE may perform the CAP again from the backoff counter value 5 (or from 4 after decrementing the backoff counter value by 1) instead of setting the backoff counter value Ninit.

On the other hand, if the channel is busy during the defer duration (S1270; N), the UE re-performs operation S1260 and checks again whether the channel is idle for a new defer duration.

If the UE has not transmitted a transmission including PUSCH on a carrier on which LAA Scell(s) transmission(s) are performed after step 4 in the procedure above, the UE may transmit a transmission including PUSCH on the carrier if the following conditions are met:

the channel is sensed to be idle at least in a slot duration Tsl when the UE is ready to transmit the transmission including PUSCH; and the channel has been sensed to be idle during all the slot durations of a defer duration Td immediately before the transmission including PUSCH.

On the other hand, if the channel has not been sensed to be idle in a slot duration Tsl when the UE first senses the channel after it is ready to transmit, or if the channel has not been sensed to be idle during any of the slot durations of a defer duration Td immediately before the intended transmission including PUSCH, the UE proceeds to step 1 after sensing the channel to be idle during the slot durations of a defer duration Td.

The defer duration Td consists of duration Tf (=16 us) immediately followed by mp consecutive slot durations where each slot duration Tsl is 9 us, and Tf includes an idle slot duration Tsl at the start of Tf.

A slot duration Tsl is considered to be idle if the UE senses the channel during the slot duration, and the power detected by the UE for at least 4 us within the slot duration is less than energy detection threshold XThresh. Otherwise, the slot duration Tsl is considered to be busy.

$CW_{min,p} \leq CW_p \leq CW_{max,p}$ is the contention window. CWp adjustment is described in detail in sub clause 3.2.2.

$CW_{min,p}$ and $CW_{max,p}$ chosen before step 1 of the procedure above.

$m_p$, $CW_{min,p}$, and $CW_{max,p}$ are based on channel access priority class signaled to the UE (see Table 7).

$X_{Thresh}$ is adjusted as described in sub clause 3.2.3.

3.2.1.2. Type 2 UL Channel Access Procedure

If the UL uses Type 2 channel access procedure for a transmission including PUSCH, the UE may transmit the transmission including PUSCH immediately after sensing the channel to be idle for at least a sensing interval $T_{short\_ul}=25$ us. Tshort_u consists of a duration $T_f=16$ us immediately followed by one slot duration $T_{sl}=9$ us and Tf includes an idle slot duration Tsl at the start of Tf. The channel is considered to be idle for Tshort_ul if it is sensed to be idle during the slot durations of Tshort_ul.

3.2.2. Contention Window Adjustment Procedure

If the UE transmits transmissions using Type 1 channel access procedure that are associated with channel access priority class p on a carrier, the UE maintains the contention window value CWp and adjusts CWp for those transmissions before step 1 of the procedure described in sub clause 3.2.1.1 (i.e., before performing the CAP), using the following procedure:

if a NDI (New Data Indicator) value for at least one HARQ process associated with HARQ_ID_ref is toggled, for every priority class p∈{1,2,3,4}, set $CW_p=CW_{min,p}$;
otherwise, increase CWp for every priority class p∈{1, 2,3,4} to the next higher allowed value.

Here, HARQ_ID_ref is the HARQ process ID of UL-SCH in reference subframe nref. The reference subframe nref is determined as follows:

If the UE receives a UL grant in subframe ng, subframe nw is the most recent subframe before subframe ng-3 in which the UE has transmitted UL-SCH using Type 1 channel access procedure:

If the UE transmits transmissions including UL-SCH without gaps starting with subframe n0 and in subframes $n_0, n_1, \ldots, n_w$, reference subframe nref is subframe n0;

otherwise, reference subframe nref is subframe nw.

The UE may keep the value of CWp unchanged for every priority class p∈{1,2,3,4}, if the UE scheduled to transmit transmissions without gaps including PUSCH in a set of subframes $n_0, n_1, \ldots, n_{w-1}$ using Type 1 channel access procedure, and if the UE is not able to transmit any transmission including PUSCH in the set of subframes.

The UE may keep the value of CWp for every priority class p∈{1,2,3,4} the same as that for the last scheduled transmission including PUSCH using Type 1 channel access procedure, if the reference subframe for the last scheduled transmission is also $n_{ref}$.

If $CW_p=CW_{max,p}$, the next higher allowed value for adjusting CWp is $CW_{max,p}$.

If the $CW_p=CW_{max,p}$ is consecutively used K times for generation of Ninit, CWp is reset to CWmin,p only for that priority class p for which $CW_p=CW_{max,p}$ is consecutively used K times for generation of Ninit. K is selected by the UE from the set of values {1, 2, . . . , 8} for each priority class p∈{1,2,3,4}.

3.2.3. Energy Detection Threshold Adaptation Procedure

A UE accessing a carrier on which LAA Scell(s) transmission(s) are performed, shall set the energy detection threshold (XThresh) to be less than or equal to the maximum energy detection threshold XThresh_max.

The maximum energy detection threshold XThresh_max is determined as follows:

if the UE is configured with higher layer parameter 'maxEnergyDetectionThreshold-r14',
XThresh_max is set equal to the value signaled by the higher layer parameter;
otherwise,
the UE shall determine X'Thresh_max according to the procedure described in sub clause 3.2.3.1;
if the UE is configured with higher layer parameter 'energyDetectionThresholdOffset-r14',
XThresh_max is set by adjusting X'Thresh_max according to the offset value signaled by the higher layer parameter;
otherwise,
the UE shall set to $X_{Thresh\_max}=X'_{Thresh\_max}$.

3.2.3.1. Default Maximum Energy Detection Threshold Computation Procedure

If the higher layer parameter 'absenceOfAnyOtherTechnology-r14' indicates TRUE:

$$X'_{Thresh\_max} = \min\left\{\begin{array}{l} T_{max} + 10 \text{ dB}, \\ X_r \end{array}\right\},$$

where Xr is the maximum energy detection threshold defined by regulatory requirements in dBm when such requirements are defined, otherwise $X_r=T_{max}+10$ dB; otherwise, $$X'_{Thres\_max} = \max\left\{\begin{array}{l} -72 + 10 \cdot \log 10(BWMHz/20 \text{ MHz}) \, dBm \\ \min\left\{\begin{array}{l} T_{max}, \\ T_{max} - T_A + (P_H + 10 \cdot \log 10(BWMHz/20 \text{ MHz}) - P_{TX}) \end{array}\right\} \end{array}\right\},$$

where each variable is defined as follows:
$T_A=10$ dB
$P_H=23$ dBm:
$P_{TX}$ set o the value of $P_{CMAX\_H,c}$ as defined in 3GPP TS 36.101.
$T_{max}$ (dBm)=10·log 10 (3.16228·10$^{-8}$ (mW/MHz)· BWMHz (MHz))
BWMHz is the single camel bandwidth in MHz.

3.3. Sub-Frame Structure Applicable to LAA System

Figure 13:
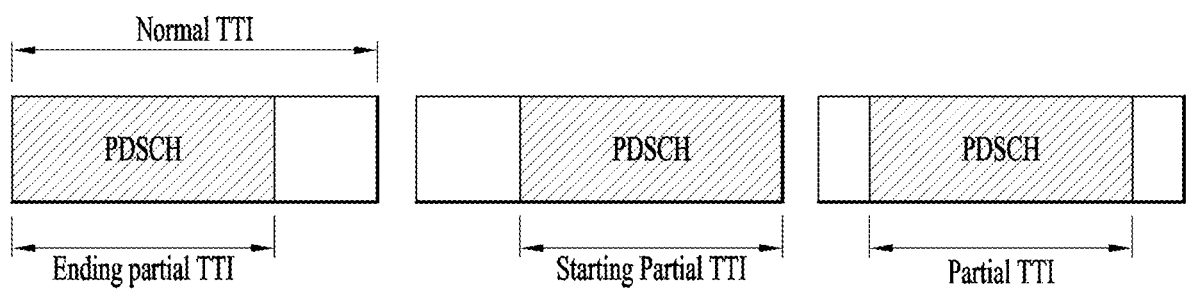
FIG. 13 is a diagram illustrating a partial TTI or a partial subframe applicable to the present disclosure.

FIG. 13 is a diagram illustrating a partial TTI or a partial subframe applicable to the present disclosure.

In the Release-13 LAA system, a partial TTI defined as DwPTS to make the most use of MCOT and support continuous transmission in transmitting a DL transmission burst is defined. The partial TTI (or partial subframe) refers to an interval in which a signal is transmitted only by a length less than the conventional TTI (e.g., 1 ms) in transmitting PDSCH.

In the present disclosure, for simplicity, a starting partial TTI or a starting partial subframe refers to a subframe in which some symbols in the head part are left blank, and an ending partial TTI or an ending partial subframe refers to a subframe in which some symbols in the tail part are left blank (whereas a complete TTI is called a normal TTI or a full TTI).

FIG. 13 is a diagram illustrating various forms of the partial TTI described above. In FIG. 13, the first block represents an ending partial TTI (or subframe), and the second block represents a starting partial TTI (or subframe). The third block of FIG. 13 represents a partial TTI (or subframe) having some symbols in the head and tail parts of a subframe left blank. Here, a time interval having no signal transmission in a normal TTI is called a transmission gap (TX gap).

While FIG. 13 is illustrated based on the DL operation, the illustrated structure is also applicable to the UL operation in the same manner. For example, the partial TTI structure shown in FIG. 13 is applicable to PUCCH and/or PUSCH transmission.

4. Proposed Embodiments

Hereinafter, the configurations according to the present disclosure will be described in detail based on the above-described technical features.

In a wireless communication system to which the present disclosure is applicable, as many communication devices have required high communication capacity, the necessity for a method of efficiently using resources in limited frequency bands has increased.

For example, a method of using an unlicensed band of 2.4 GHz, which is commonly used in the conventional Wi-Fi system, or an unlicensed band of 5 or 60 GHz, which attracts attention, in traffic offloading is considered in a cellular communication system such as the LTE/NR system.

Basically, each communication node competes with other communication nodes to perform wireless transmission and reception in unlicensed bands. Thus, before transmitting a signal, each communication node needs to perform channel sensing to check whether other communication nodes perform no signal transmission. The above operation may be referred to as listen before talk (LBT) or a channel access procedure. In particular, an operation of checking whether other communication nodes perform signal transmission may be referred to as carrier sensing (CS). When it is determined that there is no communication node performing signal transmission, it may be said that clear channel assessment (CCA) is confirmed.

In the LTE/NR system to which the present disclosure is applicable, a BS (e.g., eNB or gNB) or a UE needs to perform LBT to transmit a signal in an unlicensed band (hereinafter referred to as a U-band). In addition, when the BS or UE in the LTE/NR system performs signal transmission, other communication nodes such as a Wi-Fi node, etc. need to perform the LBT to avoid causing interference to the BS or UE.

For example, in Wi-Fi specifications (e.g., 801.11ac), a CCA threshold of −62 dBm is defined for a non-Wi-Fi signal, and as a CCA threshold of −82 dBm is defined for a Wi-Fi signal. That is, when a station (STA) or an access point (AP) operating according to the Wi-Fi specifications receives a non-Wi-Fi signal with power over −62 dBm, the STA or AP may not perform signal transmission to avoid causing interference.

In the present disclosure, signals that are continuously transmitted by a BS or a UE with no gap in the time domain in a U-band NR system is referred to as a transmission (TX) burst.

The U-band proposed in the present disclosure may include not only a U-band in the above-described LAA system but also a U-band independently operating regardless of other frequency bands (e.g., stand-alone system), a U-band operating as a PCell in a wireless communication system, and a U-band operating as a SCell depending while being subordinate to a PCell corresponding to another U-band. Therefore, the UE and BS according to the present disclosure may perform the operations proposed in the present disclosure in various U-bands. The U-band proposed in the present disclosure may include not only a U-band in the above-described LAA system but also a U-band independently operating regardless of other frequency bands (e.g., stand-alone system), a U-band operating as a PCell in a wireless communication system, and a U-band operating as a SCell depending while being subordinate to a PCell corresponding to another U-band. Therefore, the UE and BS according to the present disclosure may perform the operations proposed in the present disclosure in various U-bands.

According to the present disclosure, a BS or a UE may configure a TX burst based on the following methods.

4.1. First TX Burst Configuration and Transmission Method

All DL signals/channels included in one TX burst may have spatial (partial) QCL relationships.

Figure 14:
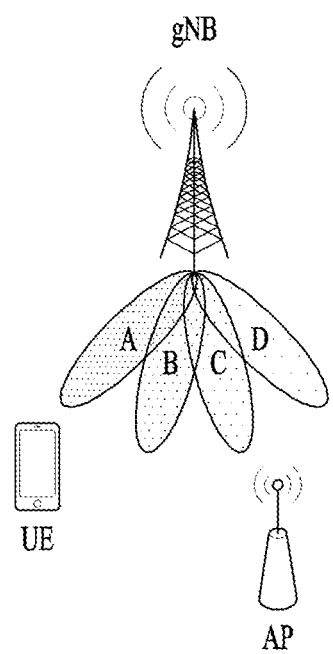
FIG. 14 is a diagram schematically illustrating an operation in which a base station (BS) transmits a transmission (TX) burst composed of four slots according to the present disclosure.
Figure 14:
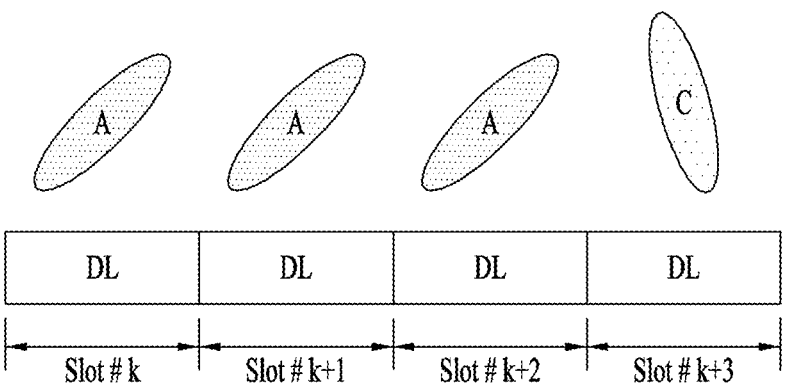

FIG. 14 is a diagram schematically illustrating an operation in which a BS transmits a TX burst including four slots according to the present disclosure.

As shown in FIG. 14, a BS may transmit a Tx burst including a total of four slots after succeeding in the LBT (or CAP). The BS may transmit a signal (or TX burst) in three slots in the direction of beam A and then transmit a signal (or TX burst) in the fourth slot in the direction of beam C.

If a Wi-Fi AP, which coexists (with the gNB) in a corresponding U-band, fails to detect a signal while the BS transmits the signal in the direction of beam A, the Wi-Fi AP may determine that a corresponding channel is idle, and start signal transmission/reception after succeeding in the LBT (or CAP) for the corresponding channel. In this case, a signal transmitted by the BS from slot # k+3 in the direction of beam C may act as interference to a corresponding Wi-Fi signal.

As described in the above example, if the BS changes its beam direction with no additional LBT (or CAP) while transmitting a signal on beam A may cause interference to other coexisting radio nodes. Thus, the BS may be required not to change the TX beam direction of the TX burst after success of the LBT (or CAP).

Therefore, the present disclosure proposes to configure all DL signals/channels in one TX burst such that spatial (partial) QCL relationships are established between the DL signals/channels. Here, the partial QCL relationship may be the same as described in clause 1.4.

For example, a wide-beam tracking reference signal (TRS) (or a CSI-RS for tracking) and a CSI-RS transmitted on a beam relatively narrower than the TRS may be partially QCL.

In the present disclosure, a DL signal/channel may include at least one of the following signals/channels.
Primary synchronization signal (PSS)
Secondary synchronization signal (SSS)
Demodulation reference signal (DMRS) for physical broadcast channel (PBCH)
PBCH
Tracking reference signal (TRS) or channel state information-reference signal (CSI-RS) for tracking
CSI-RS for channel state information (CSI) acquisition
CSI-RS for radio resource management (RRM) measurement
CSI-RS for beam management
DMRS for PDCCH
DMRS for PDSCH
PDCCH (or control resource set for transmitting PDCCH)
PDSCH
A signal obtained by modifying the above-described various signals or a newly introduced signal may be added. Specifically, signals for tracking, (fine) time/frequency synchronization, coexistence, power saving, frequency reuse factor=1, acquisition and/or identification for serving cell transmission, etc. may be added and located before a TX burst.

In the present disclosure, when an SS block (e.g., PSS, SSS, DMRS for PBCH, and/or signal for PBCH) is included in a TX burst transmitted in a specific direction, it may mean that some of the SS blocks that need to be periodically transmitted through beam sweeping are transmitted in the beam direction of the TX burst, or an SS burst (partially) QCL with DL signals/channels in the corresponding TX burst is transmitted with no additional LBT (or CAP).

However, considering a UE which expects that the SS blocks will be transmitted through the beam sweeping, if some SS blocks are transmitted in a specific direction, the time delay in initial access may increase or the accuracy of RRM measurement may decrease.

To solve this problem, a method for configuring an occasion separately for each specific beam or SS block.

For example, when a BS transmits four SS blocks, the BS may transmit the four SS blocks by configuring a transmission time separately for each SS block (or SS block group), instead of transmitting all the four SS blocks periodically and continuously in the time domain.

Specifically, the first SS block may be transmitted in slot # n+k1, slot # n+2*k1, slot # n+3*k1, . . . , the second SS block may be transmitted in slot # n+k2, slot # n+2*k2, slot # n+3*k2, . . . , the third SS block may be transmitted in slot # n+k3, slot # n+2*k3, slot # n+3*k3, . . . , and the fourth SS block may be transmitted in slot # n+k4, slot # n+2*k4, slot # n+3*k4, In this case, if the BS succeeds in the LBT (or CAP) in slot # n+k3−1, the BS may transmit DL signals continuously with no additional LBT (or CAP) for SS block transmission in slot # n+k3 by transmitting a TX burst including only the DL signals/channels (partially) QCL with the third SS block from the corresponding slot.

The corresponding method may be applied when a timing configuration is configured for SS/PBCH-based RRM measurement and/or CSI-RS-based RRM measurement. In other words, the timing configuration or transmission time may be separately configured such that an SS/PBCH for RRM measurement and/or a CSI-RS for RRM measurement is transmitted for each beam (or beam group), instead of configuring the timing configuration such that the SS/PBCH for RRM measurement and/or the CSI-RS for RRM measurement is transmitted periodically and continuously in all beam directions in the time domain.

Alternatively, when a UE receives a (unicast) DL signal/channel in a TX burst, the UE may assume that there are only spatially QCL SS block(s) and then attempt the signal reception after performing rate matching (or puncturing).

Specifically, it is assumed that a time period during which N SS blocks (and/or broadcast PDCCHs/PDSCHs (multiplexed with the corresponding SS blocks)) are periodically transmitted is configured (where the value of N may be predefined or configured by RRC signaling). In this case, a UE for receiving a (unicast) DL signal/channel in a TX burst during a time interval overlapping with the corresponding time period may perform rate matching (or puncturing) of resources for SS block(s) spatially QCL with the TX burst (and/or broadcast PDCCH(s)/PDSCH(s) (multiplexed with the corresponding SS block(s))) for PDCCH/PDSCH reception and assume that non-QCL SS block(s) (and/or broadcast PDCCH(s)/PDSCH(s) (multiplexed with the corresponding SS block(s))) are not transmitted.

For example, when an interval for transmitting four SS blocks continuously is configured, if a UE receives a specific PDCCH in the corresponding interval, the UE may assume transmission of SS block #0 spatially QCL with a CORE-SET in which a corresponding PDCCH is included (i.e., the UE may not assume transmission of SS block #1/2/3) and then perform PDSCH reception by performing rate matching (or puncturing).

Alternatively, when a time period during which N SS blocks (and/or broadcast PDCCHs/PDSCHs (multiplexed with the corresponding SS blocks)) are periodically transmitted is configured, a UE intending to receive a (unicast) DL signal/channel in a TX burst during a time interval overlapping with the corresponding time period may assume that all SS blocks in the corresponding transmission interval (and/or broadcast PDCCHs/PDSCHs (multiplexed with the corresponding SS blocks)) are not transmitted.

In particular, if an SS block transmission interval where measurement for a neighbor cell (and/or a serving cell) is capable of being skipped is configured, the above method may be applied only to SS block(s) transmitted in the corresponding transmission interval.

In addition, the above method may be equally applied to a CSI-RS. Specifically, when a time period during which K CSI-RSs (and broadcast PDCCHs/PDSCHs multiplexed with the corresponding CRI-RSs) are transmitted is configured, a UE intending to receive a (unicast) DL signal/channel in a TX burst during a time interval overlapping with the corresponding time period may perform rate matching (or puncturing) of resources for CSI-RS(s) spatially QCL with the TX burst (and/or broadcast PDCCH(s)/PDSCH(s) multiplexed with the corresponding CSI-RS(s)) for PDCCH/PDSCH reception and assume that non-QCL CSI-RS(s) (and/or broadcast PDCCH(s)/PDSCH(s) multiplexed with the corresponding CSI-RS(s)) are not transmitted.

The above-described first TX burst configuration and transmission method may be applied only when a TX burst includes a PDCCH and/or a PDSCH.

For example, if a TX burst includes an SS block only, a BS may be allowed to transmit the TX burst by applying the beam sweeping for beam change with no additional LBT (or CAP).

Alternatively, the above-described first TX burst configuration and transmission method may be applied only when the transmission time period of DL signals/channels transmitted in one beam direction (i.e., DL signals/channels satisfying one spatial (partial) QCL relationship) is longer than or equal to X usec. In other words, when the transmission time period of the DL signals/channels at one spatial (partial) QCL is less than X usec, the BS may be allowed to transmit the DL signals/channels by applying the beam sweeping for the beam change with no additional LBT (or CAP).

Further, first few DL signals/channels (within X1 usec) and/or last few DL signals/channels (within X2 usec) in a Tx burst may be allowed to be transmitted (through the beam sweeping) regardless of spatial (partial) QCL relationships.

4.2. Second TX Burst Configuration and Transmission Method

All UL signals/channels included in one TX burst may have spatial (partial) QCL relationships.

In the case of a UL TX burst, it is desirable to configure the UL TX burst with UL signals/channels having spatial (partial) QCL relationships as in a DL TX burst. In the present disclosure, a UL signal/channel may include at least one of the following signals/channels.

Sounding reference signal (SRS)
DMRS for PUCCH
DMRS for PUSCH
PUCCH
PUSCH
Physical random access channel (PRACH)

In other words, a UE may expect to be assigned only spatially (partially) QCL UL signals/channels for a UL TX burst that is continuously scheduled with no gap. If the UE is scheduled to include UL signals/channels having no spatial (partial) QCL relationships in one UL TX burst, the UE may drop the entirety of the corresponding UL TX burst or drop specific UL signal(s)/channel(s) according to a priority rule.

For example, the UE may prioritize a UL signal/channel first scheduled (or started) in the time domain and then drop transmission of UL signals/channels that are not spatially (partially) QCL with the corresponding UL signal/channel.

As another example, when the following priority rule is determined: beam management SRS>PUCCH with HARQ-ACK>PUCCH with aperiodic CSI>aperiodic SRS>PUCCH with semi-persistent/periodic CSI>PUSCH with UCI>PUSCH without UCI>periodic SRS, the UE may transmit UL signals/channels that are spatially (partially) QCL with a UL signal/channel with a high priority and drop transmission of other UL signals/channels based on the priority rule.

The above operation may be equally applied to autonomous UL TX that is not based on scheduling but performed with no UL grant.

The above-described second TX burst configuration and transmission method may be applied only when a TX burst includes a PUCCH and/or a PUSCH. For example, when a TX burst includes an SRS only, a UE may be allowed to transmit the TX burst by applying the beam sweeping for beam change with no additional LBT (or CAP).

Alternatively, the above-described second TX burst configuration and transmission method may be applied only when the transmission time period of UL signals/channels transmitted in one beam direction (i.e., UL signals/channels satisfying one spatial (partial) QCL relationship) is longer than or equal to Y usec. In other words, when the transmission time period of the UL signals/channels at one spatial (partial) QCL is less than Y usec, the UE may be allowed to transmit the UL signals/channels by applying the beam sweeping for the beam change with no additional LBT (or CAP).

Further, first few UL signals/channels (within Y1 usec) and/or last few UL signals/channels (within Y2 usec) in a Tx burst may be allowed to be transmitted (through the beam sweeping) regardless of spatial (partial) QCL relationships.

4.3. Third TX Burst Configuration and Transmission Method

To share a channel occupancy time (COT) between DL and UL TX bursts, different TX burst configuration and transmission methods may be applied depending on link relationships between DL signals/channels and UL signals/channels.

In the Rel-14 LAA system, a BS may occupy a COT by performing the LBT (or CAP) and yield a part of the COT to a UE. In this case, if the BS determines that a channel is idle for a predetermined time by performing the CCA, the BS may indicate a type 2 channel access procedure (CAP) for accessing the corresponding channel to the UE through a UL grant. Alternatively, even though the UE is configured with a type 1 CAP, which corresponding to random backoff based LBT, if the UE is capable of recognizing that scheduled UL data transmission is within the COT occupied by the BS, the UE may be allowed to perform the type 2 CAP instead of the type 1 CAP indicated by the UL grant.

In this case, the UE may recognize whether the scheduled UL data transmission is included in the COT occupied by the BS based on signaling on the start/duration of a UL burst on a common PDCCH transmitted from the BS.

In the NR system to which the present disclosure is applicable, a method of signaling information on beams to be used by a UE for UL transmission/reception by associating DL and UL signals with each other may be supported.

For example, when a CSI-RS resource is associated with an SRS resource and the direction of a beam considered (or generated) by the UE to receive a CSI-RS on the CSI-RS resource remains, the UE may transmit an SRS on the SRS resource associated with the CSI-RS resource through a TX beam corresponding to the CSI-RS RX beam (or transmit a PUSCH scheduled by a UL grant that signals the SRS resource linked to the CSI-RS resource). In this case, a relationship between specific RX and TX beams may be configured based on UE implementation (when the UE has beam correspondence capability) or by BS-to-UE training (when the UE has no beam correspondence capability).

Thus, when association between DL and UL signals is defined, COT sharing may be allowed between a DL TX burst composed of DL signals/channels spatially (partially) QCL with the corresponding DL signal and a UL TX burst (composed of UL signals/channels spatially (partially) QCL with the UL signal associated with the DL signal).

In this case, the allowance of the COT sharing may mean one of the following options.

Opt 1: The BS may indicate the type 2 CAP in scheduling the UL TX burst to be shared.

Opt 2: If the UE recognizes that the COT is shared with the BS, the UE may attempt to transmit the UL TX burst through the type 2 CAP even though the type 1 CAP is indicated for the UL Tx burst.

Opt 3: If the UE recognizes that the COT is shared with the BS for scheduled UL TX burst transmission, the UE may attempt the corresponding UL TX burst transmission through the type 2 CAP even though a UL grant includes no CAP indication.

Opt 4: If the UE recognizes that the COT is not shared with the BS for scheduled UL TX burst transmission, the UE may attempt the corresponding UL TX burst transmission through the type 1 CAP even though a UL grant includes no CAP indication.

In the above-described operation, the UE may determine whether the COT is shared with the BS for the scheduled UL TX burst transmission (or whether the UL Tx burst is shared with the gNB) if a beam index (e.g., a (partially) QCL SS burst index, a CSI-RS resource index, a TRS port index, a DMRS port index in a common PDCCH, etc.) in the DL TX burst and/or the start/duration of the UL burst are signaled.

Figure 15:
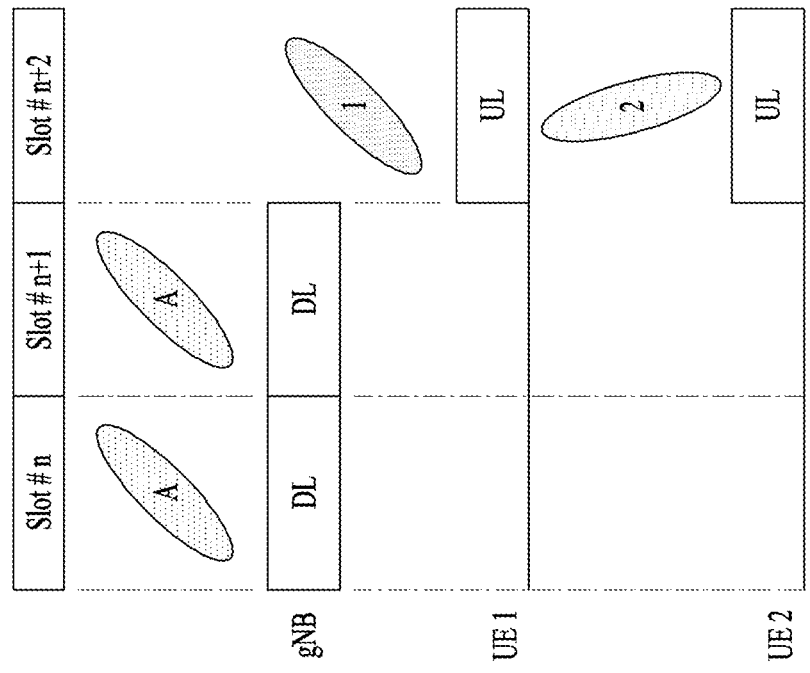
FIG. 15 is a diagram schematically illustrating a signal transmission/reception operation when beam A of a BS is associated with beam 1 of user equipment (UE) 1 and beam C of the BS is associated with beam 2 of UE 2.
Figure 15:
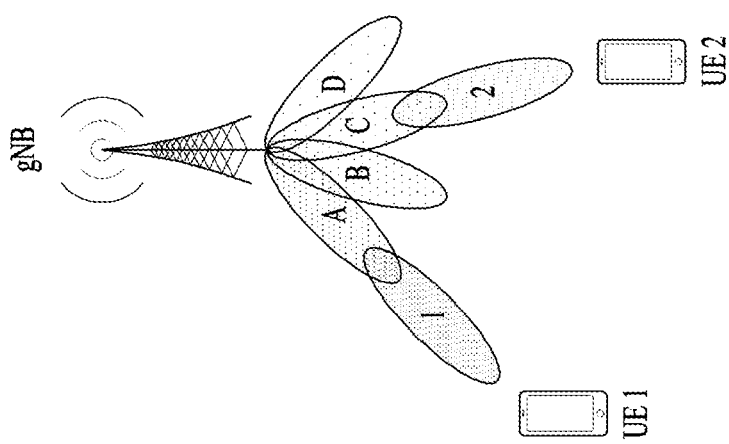

FIG. 15 is a diagram schematically illustrating a signal transmission/reception operation when beam A of a BS is associated with beam 1 of UE 1 and beam C of the BS is associated with beam 2 of UE 2.

As shown in FIG. 15, when beam A of the BS (i.e., gNB) is associated with beam 1 of UE 1 and beam C of the BS is associated with beam 2 of UE 2, if the BS succeeds in LBT (or a CAP) (capable of securing a COT greater than or equal to three slots), the BS may transmit a DL TX burst composed of DL signals/channels that are spatially (partially) QCL with beam A from slot # n for two slots. In this case, among UE 1 and UE 2 that are scheduled with UL data transmission in slot # n+2, only UE 1 may recognize that a scheduled UL TX burst is shared with the BS.

Thus, the BS may be allowed to indicate the type 2 CAP to UE 1 in a UL grant. Alternatively, UE 1 may be allowed to apply the type 2 CAP even though the type 1 CAP is indicated by the UL grant. Further, even though the UL grant includes no CAP indication, UE 1 may determine that UE 1 needs to perform (or is capable of performing) the type 2 CAP, and UE 2 may determine that UE 2 needs to perform (or is capable of performing) the type 1 CAP.

As another method, when transmitting a (scheduled) UL TX burst, a UE may recognize that the corresponding UL TX burst is shared (or associated) with a DL TX burst transmitted from a BS. In this case, it may be regulated that the UL TX burst is configured only with UL signals/channels spatially (partially) QCL with UL signals/channels associated with DL signals/channels constituting the DL TX burst. In addition, the UE may be allowed to transmit the corresponding UL TX burst through the type 2 CAP.

For example, referring to FIG. 15, it is assumed that the BS transmits DL signals/channels on beam A or DL signals/channels (partially) QCL with beam A in slots # n and n+1, and upon receiving the DL signals/channels, UE 1 transmits scheduled UL signals/channels in slot # n+2. In this case, it may be regulated that if UE 1 is signaled that slot # n+2 is included in the COT of the BS and thus slot # n+2 is shared, UE 1 transmits the UL signals/channels on antenna port(s) (partially) QCL with beam 1 associated with beam A.

As a modification of the above-described operations, the type 2 CAP may be replaced with a 'type 3 CAP (i.e., transmission may be attempted with no CAP)'. In this case, whether a specific UE applies the type 2 CAP or the type 3 CAP may be configured/indicated by RRC (or L1) signaling. Alternatively, whether the specific UE applies the type 2 CAP or the type 3 CAP may be determined based on a time gap between DL and UL TX bursts (or a time gap between UL TX bursts) (for example, when the gap is smaller than or equal to 16 usec, the type 3 CAP may be applied, and when the gap is greater than 16 usec and smaller than or equal to 25 usec, the type 2 CAP may be applied).

In the third TX burst configuration and transmission method, how a BS shares with a UE a COT obtained by performing the random backoff based LBT (or CAP) has been mainly described. The corresponding operation may be equally applied when the UE shares a COT obtain by performing the type 1 CAP with the BS. That is, when association between DL and UL signals is defined, COT sharing may be allowed between a DL TX burst (composed of DL signals/channels spatially (partially) QCL with the corresponding DL signal) and a UL TX burst (composed of UL signals/channels spatially (partially) QCL with the UL signal associated with the DL signal). When the COT sharing is allowed, the BS may perform the CCA and then determine whether a channel is idle for a predetermined time. If it is determined that the channel is idle, the BS may perform the corresponding DL TX burst transmission (with no CAP).

4.4. Fourth TX Burst Configuration and Transmission Method

In this case, a description will be given of CAPs applicable depending on the transmission location and/or transmission duration of a TX burst, and/or the type of information/channel/signal included in the TX burst.

When at least one (i.e., some or all) of the following conditions is satisfied, a BS or a UE may perform the CCA. If it is determined that a channel is idle for a predetermined time, the BS or UE may be allowed to use the type 2 CAP (or type 3 CAP) capable of accessing the corresponding channel.

When a TX burst is transmitted in a predefined or configured specific window (e.g., when the TX burst is transmitted in an SS block transmission window defined in the NR unlicensed band (NR-U) system, a broadcast PDCCH and/or PDSCH transmission occasion, etc.)

When a TX burst includes a specific signal/channel (e.g., when a DL TX burst includes an SS block, a broadcast PDCCH, and/or a broadcast PDSCH)

When a TX burst is started with a specific signal/channel (e.g., when a DL TX burst is started with an SS block, a broadcast PDCCH, and/or a broadcast PDSCH)

When the transmission duration of a TX burst is smaller than or equal to T msec (e.g., T=1)

Alternatively, when at least one (i.e., some or all) of the following conditions is satisfied, the BS or UE may perform the type 1 CAP corresponding to the random backoff based LBT.

When a TX burst is transmitted out of a predefined or configured specific window (e.g., when the TX burst is transmitted out of an SS block transmission window defined in the NR-U system, a broadcast PDCCH and/or PDSCH transmission occasion, etc.)

When a TX burst does not include a specific signal/channel (e.g., when a DL TX burst does not include an SS block, a broadcast PDCCH, and/or a broadcast PDSCH)

When a TX burst is not started with a specific signal/channel (e.g., when a DL TX burst is not started with an SS block, a broadcast PDCCH, and/or broadcast PDSCH)

When the transmission duration of a TX burst is greater than T msec (e.g., T=1)

4.5. Summary

Figure 16:
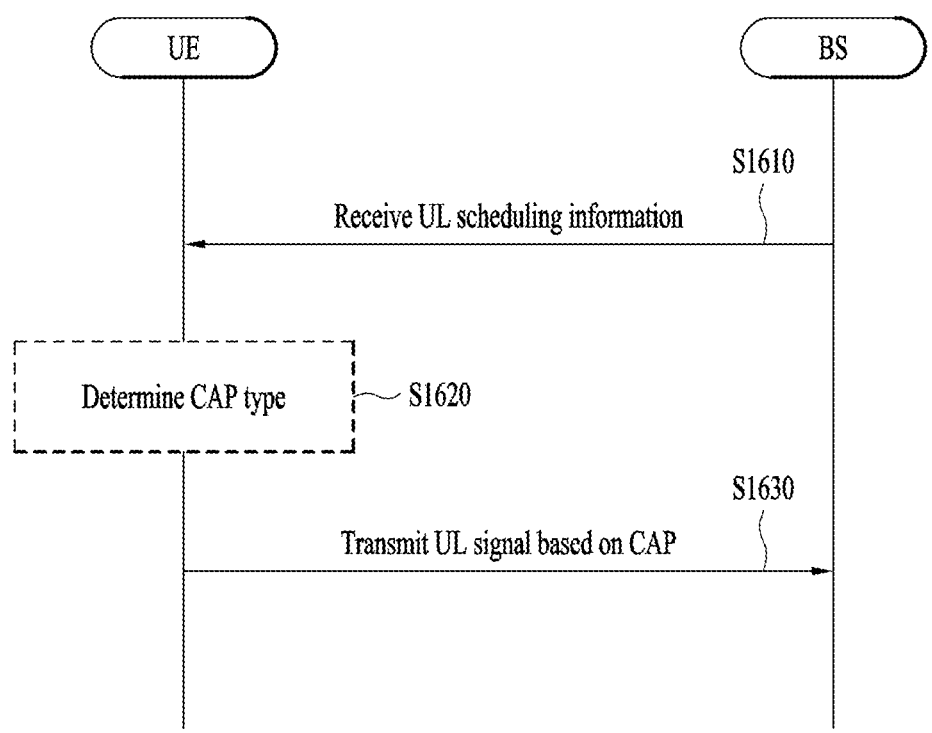
FIG. 16 is a diagram schematically illustrating a method by which a UE and a BS transmit and receive a UL signal in an unlicensed-band applicable to the present disclosure.
Figure 17:
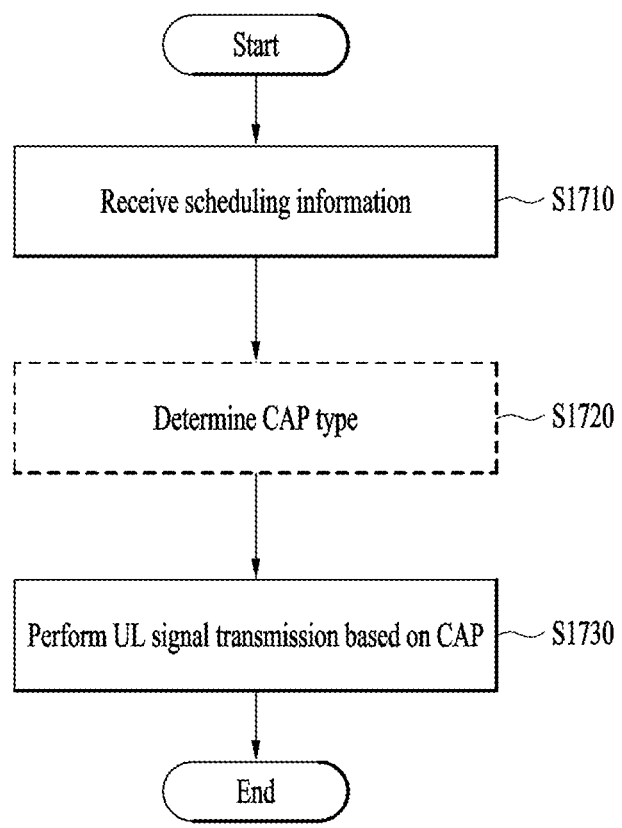
FIG. 17 is a flowchart illustrating a method by which a UE transmits a UL signal in a U-band applicable to the present disclosure

FIG. 16 is a diagram schematically illustrating a method by which a UE and a BS transmit and receive a UL signal in a U-band applicable to the present disclosure, and FIG. 17 is a flowchart illustrating a method by which a UE transmits a UL signal in a U-band applicable to the present disclosure.

According to the present disclosure, the UE may receive scheduling information for scheduling UL signal transmission in the U-band from the BS ((S1610 and S1710).

The UE may receive the scheduling information in an UL grant or DCI.

The UE may perform the scheduled UL signal transmission to the BS in the U-band based on a CAP (S1630 and S1730).

To this end, the UE may determine the type of the CAP for the scheduled UL signal transmission (S1620 and S1730).

When it is said that the UE determines the CAP type, it may mean not only that the UE autonomously determines the type of the CAP through separate processing but also that the type of the CAP that the UE needs to perform is determined based on conditions of the scheduled UL signal transmission.

In this case, if the UL signal transmission is scheduled within a COT occupied by the BS, the type of the CAP may be determined depending on whether a first beam of a DL TX burst transmitted from the BS is associated with a second beam for the UL signal transmission within the COT.

When the second beam is associated with the first beam, the second beam may be associated with a third beam for reception of the DL TX burst. In other words, there may be established beam reciprocity between the second and third beams.

In the present disclosure, the type of the CAP may be either a first type of CAP based on random backoff or a second type of CAP for sensing whether the U-band is idle for a predetermined time.

For example, when the UL signal transmission is scheduled within the COT occupied by the BS and the first and second beams are associated with each other, the UE may perform the scheduled UL signal transmission to the BS in the U-band based on the second type of CAP.

When the UL signal transmission is scheduled within the COT occupied by the BS and the first and second beams are associated with each other, the UE may receive a signal for signaling the second type of CAP as the type of the CAP for the UL signal transmission.

As another example, when the UL signal transmission is scheduled within the COT occupied by the BS and the first and second beams are associated with each other, the UE may perform the scheduled UL signal transmission to the BS in the U-band based on the second type of CAP even though the UE receives a signal for signaling the first type of CAP as the type of the CAP for the UL signal transmission.

As still another example, when the UL signal transmission is scheduled within the COT occupied by the BS and the first and second beams are associated with each other, the UE may perform the scheduled UL signal transmission to the BS in the U-band based on the second type of CAP without reception of a signal for signaling the type of the CAP for the UL signal transmission.

As a further example, when the UL signal transmission is scheduled within the COT occupied by the BS and the first and second beams are not associated with each other, the UE may perform the scheduled UL signal transmission to the BS in the U-band based on the first type of CAP.

As a still further example, when the UL signal transmission is not scheduled within the COT occupied by the BS, the UE may perform the scheduled UL signal transmission to the BS in the U-band based on the first type of CAP.

Since each of the examples of the proposed methods may be included as one method for implementing the present disclosure, it is apparent that each example may be regarded as a proposed method. Although the proposed methods may be implemented independently, some of the proposed methods may be combined (or merged) for implementation. In addition, it may be regulated that information on whether the proposed methods are applied (or information on rules related to the proposed methods) should be transmitted from a BS to a UE through a predefined signal (e.g., a physical layer signal, a higher layer signal, etc.).

5. Device Configurations

Figure 18:
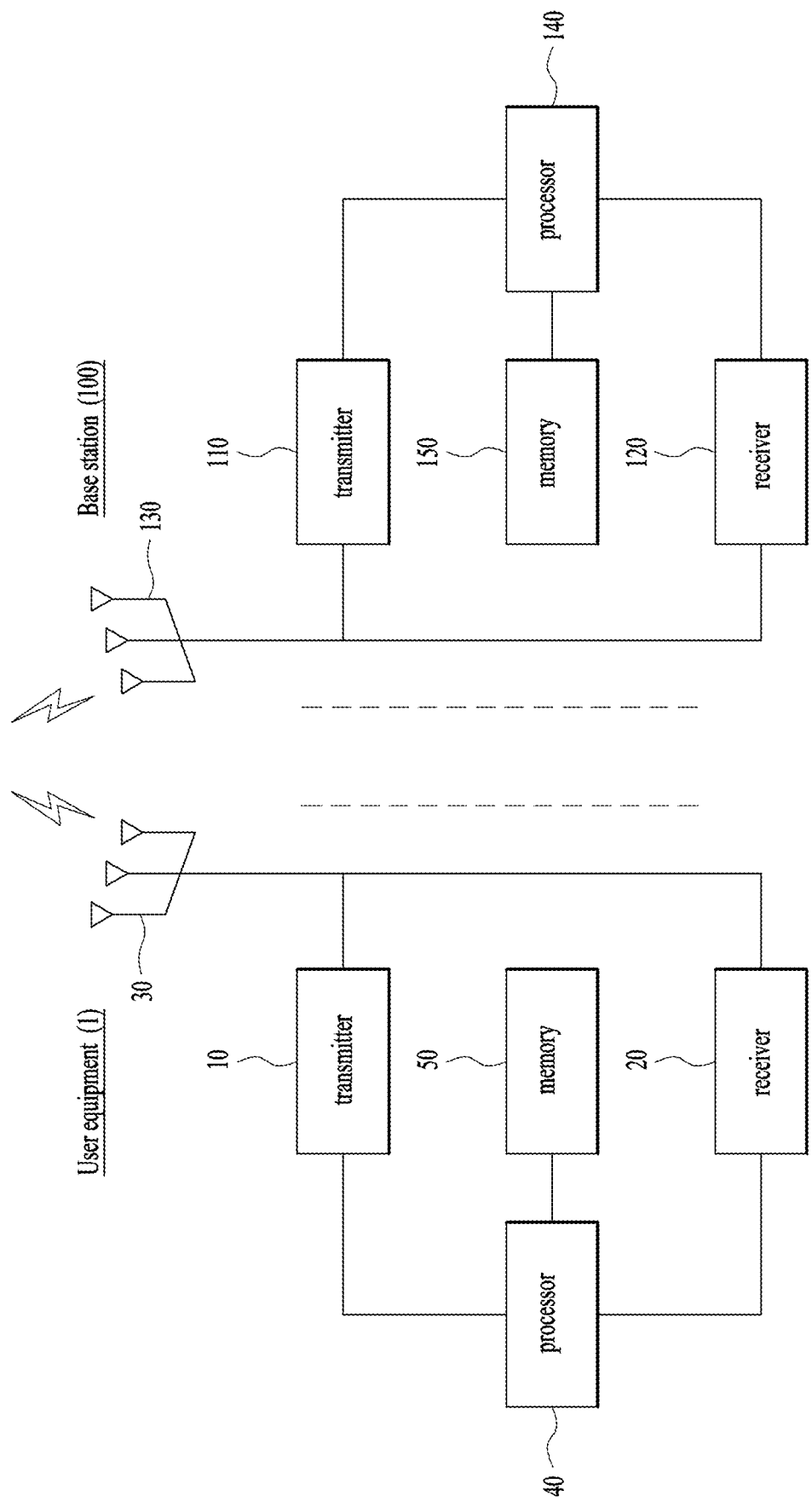
FIG. 18 is a diagram illustrating the configurations of a UE and a BS for implementing the proposed embodiments.

FIG. 18 is a diagram illustrating the configurations of a UE and a BS for implementing the proposed embodiments. The UE and BS shown in FIG. 18 may operate to implement the above-described embodiments of the method for UL signal transmission/reception between the UE and BS.

The UE 1 may act as a transmission end in UL and a reception end in DL. The BS (eNB or gNB) 100 may act as a reception end in UL and a transmission end in DL.

Each of the UE and BS may include a transmitter 10/110 and a receiver 20/120 for controlling transmission and reception of information, data, and/or messages and an antenna 30/130 for transmitting and receiving information, data, and/or messages.

In addition, each of the UE and BS may include a processor 40/140 for implementing the above-described embodiments of the present disclosure and a memory 50/150 for temporarily or permanently storing operations of the processor 40/140.

With the above configuration, the UE may operate as follows.

The UE 1 may receive scheduling information for scheduling UL signal transmission in a U-band from the BS through the processor 40 configured to control the receiver 20. Then, the UE 1 may perform the scheduled UL signal transmission to the BS in the U-band based on a CAP through the processor configured to control the transmitter 10. In this case, if the UL signal transmission is scheduled within a COT occupied by the BS, the type of the CAP may be determined depending on whether a first beam of a DL TX burst transmitted from the BS is associated with a second beam for the UL signal transmission within the COT.

The transmitters and receivers of the UE and BS may perform packet modulation/demodulation for data transmission, high-speed packet channel coding, OFDM packet scheduling, TDD packet scheduling, and/or channel multiplexing. Each of the UE and BS of FIG. 18 may further include a low-power radio frequency/intermediate frequency (RF/IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi-Mode Multi-Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g., CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. for performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method may also be applied to mmWave communication using an ultra-high frequency band.

The invention claimed is:

1. A method for transmitting an uplink signal by a user equipment (UE) to a base station (BS) in a wireless communication system supporting an unlicensed band, the method comprising:

receiving, from the BS, scheduling information for an uplink signal transmission scheduled by the BS in the unlicensed band; and performing the uplink signal transmission scheduled by the BS in the unlicensed band based on a channel access procedure (CAP), wherein the uplink signal transmission is scheduled within a channel occupancy time (COT) occupied by the BS and a type of the CAP is determined based on whether a first beam of a downlink transmission burst transmitted from the BS is associated with a second beam for the uplink signal transmission within the COT, and wherein the first beam is associated with the second beam when the downlink transmission burst is quasi co-located with the uplink signal transmission.

2. The method of claim 1,
wherein the scheduling information is received in an uplink grant or downlink control information (DCI).

3. The method of claim 1,
wherein based on the second beam associated with the first beam, the second beam is associated with a third beam for receiving the downlink transmission burst.

4. The method of claim 1,
wherein the type of the CAP is either a first type of CAP based on random back-off or a second type of CAP for sensing whether the unlicensed band is idle for a predetermined time.

5. The method of claim 4,
wherein, based on that the uplink signal transmission is scheduled within the COT occupied by the BS and the first beam and the second beam are associated with each other, the UE performs the scheduled uplink signal transmission to the BS in the unlicensed band based on the second type of CAP.

6. The method of claim 5,
wherein, based on that the uplink signal transmission is scheduled within the COT occupied by the BS and the first beam and the second beam are associated with each other, the UE receives a signal for signaling the second type of CAP as the type of the CAP for the uplink signal transmission.

7. The method of claim 4,
wherein, based on that the uplink signal transmission is scheduled within the COT occupied by the BS and the first beam and the second beam are associated with each other, the UE performs the scheduled uplink signal transmission to the BS in the unlicensed band based on the second type of CAP even though the UE receives a signal for signaling the first type of CAP as the type of the CAP for the uplink signal transmission.

8. The method of claim 4,
wherein based on that the uplink signal transmission is scheduled within the COT occupied by the base station and the first beam and the second beam are associated with each other, the UE performs the scheduled uplink signal transmission to the BS in the unlicensed band based on the second type of CAP without receiving a signal for signaling the type of the CAP for the uplink signal transmission.

9. The method of claim 4,
wherein, based on that the uplink signal transmission is scheduled within the COT occupied by the BS and the first beam and the second beam are not associated with each other, the UE performs the scheduled uplink signal transmission to the BS in the unlicensed band based on the first type of CAP.

10. A user equipment (UE) configured to transmit an uplink signal to a base station (BS) in a wireless communication system supporting an unlicensed band, the UE comprising:
a transmitter;
a receiver; and
a processor connected to the transmitter and the receiver,
wherein the processor is configured to:
control the receiver to receive, from the BS, scheduling information for an uplink signal transmission scheduled by the BS in the unlicensed band; and
control the transmitter to perform the uplink signal transmission scheduled by the BS in the unlicensed band based on a channel access procedure (CAP), and
wherein the uplink signal transmission is scheduled within a channel occupancy time (COT) occupied by the BS and a type of the CAP is determined based on whether a first beam of a downlink transmission burst transmitted from the BS is associated with a second beam for the uplink signal transmission within the COT, and
wherein the first beam is associated with the second beam when the downlink transmission burst is quasi co-located with the uplink signal transmission.

11. The UE of claim 10,
wherein the type of the CAP is either a first type of CAP based on random back-off or a second type of CAP for sensing whether the unlicensed band is idle for a predetermined time.

12. The UE of claim 11,
wherein, based on that the uplink signal transmission is scheduled within the COT occupied by the BS and the first beam and the second beam are associated with each other, the processor is configured to perform the scheduled uplink signal transmission to the BS in the unlicensed band based on the second type of CAP.

13. The UE of claim 11,
wherein, based on that the uplink signal transmission is scheduled within the COT occupied by the BS and the first beam and the second beam are not associated with each other, the processor is configured to perform the scheduled uplink signal transmission to the BS in the unlicensed band based on the first type of CAP.

* * * * *